United States Patent
Yun et al.

(10) Patent No.: US 11,006,048 B2
(45) Date of Patent: May 11, 2021

(54) METHOD AND APPARATUS FOR ACQUIRING OMNIDIRECTIONAL VIDEO

(71) Applicant: Samsung Electronics Co., Ltd, Suwon-si (KR)

(72) Inventors: Yongsang Yun, Suwon-si (KR); Dongil Son, Hwaseong-si (KR); Jongchul Choi, Suwon-si (KR); Seungnyun Kim, Incheon (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/345,678

(22) PCT Filed: Oct. 27, 2017

(86) PCT No.: PCT/KR2017/012028
§ 371 (c)(1),
(2) Date: Apr. 26, 2019

(87) PCT Pub. No.: WO2018/080244
PCT Pub. Date: May 3, 2018

(65) Prior Publication Data
US 2019/0342501 A1 Nov. 7, 2019

(30) Foreign Application Priority Data
Oct. 28, 2016 (KR) .................. 10-2016-0141788

(51) Int. Cl.
*H04N 5/232* (2006.01)
*G06T 7/50* (2017.01)
(Continued)

(52) U.S. Cl.
CPC ........... *H04N 5/23299* (2018.08); *G06T 7/20* (2013.01); *G06T 7/50* (2017.01); *G06T 7/70* (2017.01);
(Continued)

(58) Field of Classification Search
CPC .............. H04N 5/237; H04N 5/23299; H04N 5/23203; H04N 5/23216; H04N 5/23238; G06T 7/20; G06T 7/50; G06T 7/70
See application file for complete search history.

(56) References Cited

U.S. PATENT DOCUMENTS 10,051,180 B1 * 8/2018 Chen ...................... G06T 3/4038
2005/0273830 A1 * 12/2005 Silver .................. H04N 21/435
725/105
(Continued)

FOREIGN PATENT DOCUMENTS

EP 1341382 A2 * 9/2003 ......... G08B 13/1968
JP 2004135208 A * 4/2004
(Continued)

OTHER PUBLICATIONS

International Search Report dated Feb. 7, 2018 in connection with International Patent Application No. PCT/KR2017/012028, 2 pages.
(Continued)

*Primary Examiner* — Leron Beck
*Assistant Examiner* — Shanika M Brumfield

(57) ABSTRACT

An electronic apparatus according to a variety of embodiments comprises: a rotation part for rotating a plurality of cameras; a memory for storing instructions; and a processor electrically connected to the rotation part and memory, wherein the memory can store, when being executed, instructions for the processor to: acquire at least one item of image data by means of the cameras; check in the image data whether at least a portion of an object is located in an overlap
(Continued)

area; and, if at least a portion of an object is located in the overlap area, then modify the filming direction of the cameras by means of the rotation part.

13 Claims, 24 Drawing Sheets

(51) Int. Cl.
  *G06T 7/70* (2017.01)
  *G06T 7/20* (2017.01)
  *H04N 5/247* (2006.01)
(52) U.S. Cl.
  CPC ..... *H04N 5/23203* (2013.01); *H04N 5/23216* (2013.01); *H04N 5/23238* (2013.01); *H04N 5/247* (2013.01)

(56) References Cited

U.S. PATENT DOCUMENTS

| | | |
|---|---|---|
| 2008/0266408 A1 | 10/2008 | Kim |
| 2012/0155786 A1 | 6/2012 | Zargarpour et al. |
| 2012/0262572 A1* | 10/2012 | Cudak ................ H04N 5/23229 348/135 |
| 2014/0160234 A1 | 6/2014 | Okuda et al. |
| 2014/0185920 A1 | 7/2014 | Kelley et al. |
| 2017/0064210 A1* | 3/2017 | Ohno ................ H04N 5/23238 |

FOREIGN PATENT DOCUMENTS

| | | | |
|---|---|---|---|
| JP | 2007-318648 A | | 12/2007 |
| JP | 2009-244369 A | | 10/2009 |
| JP | 2011258031 A | * | 12/2011 |
| JP | 2015-226224 A | | 12/2015 |
| KR | 10-2014-0074808 A | | 6/2014 |
| KR | 101502448 B1 | * | 3/2015 |
| KR | 10-2016-0121145 A | | 10/2016 |

OTHER PUBLICATIONS

Written Opinion of the International Searching Authority dated Feb. 7, 2018 in connection with International Patent Application No. PCT/KR2017/012028, 4 pages.

* cited by examiner

METHOD AND APPARATUS FOR ACQUIRING OMNIDIRECTIONAL VIDEO

CROSS-REFERENCE TO RELATED APPLICATIONS

This application is a 371 of International Application No. PCT/KR2017/012028 filed on Oct. 27, 2017, which claims priority to Korean Patent Application No. 10-2016-0141788 filed on Oct. 28, 2016, the disclosures of which are herein incorporated by reference in their entirety.

BACKGROUND

1. Field

Various embodiments of the present invention relate to a method and device for acquiring an omnidirectional image.

2. Description of Related Art

Recently, a variety of electronic devices capable of being worn directly on a human body have been developed. Such devices are commonly referred to as wearable electronic devices. Examples of wearable electronic devices include a head-mounted display, smart glasses, a smart watch, a wristband, a contact lens type device, a ring type device, a shoe type device, a clothes type device, a glove type device, and the like, and may have various forms detachably attachable to a part of the human body or clothes.

One example of wearable electronic devices is a device that can be mounted on a user's head. This device may be referred to as a head-mounted display or head-mounted device (HMD).

The user can wear the HMD and view an omnidirectional image provided through a display of the HMD. The omnidirectional image viewed through the HMD may be obtained using an electronic device including at least two cameras.

The omnidirectional image can be acquired by stitching image data captured through a plurality of cameras. However, when such image stitching is not properly performed, this may cause a misaligned object image, a double image, or a disappearance of image when the user looks around a image acquired using an image output device (e.g., the HMD), thus lowering an immersion level. For example, a superposed portion of image data captured through a plurality of cameras may have distortion on the image in case of stitching, and if the distorted portion is exposed to a user's field of view as it is, the quality of virtual reality (VR) may be degraded. Particularly, if an important object such as a family is expressed in a distorted image when the user views an omnidirectional image through the HMD or the like, this may disappoint the user.

SUMMARY

An electronic device according to various embodiments of the invention may comprise a plurality of cameras; a rotation part configured to rotate the plurality of cameras; a memory; and a processor electrically connected to the rotation part and the memory. The memory may store instructions causing, upon execution, the processor to acquire at least one image data by using the cameras, to determine, from the image data, whether an object is located at least in part in a superposition area, and to change a capture view of the cameras by using the rotation part when the object is located at least in part in the superposition area.

A method for preventing image distortion of an object contained in an omnidirectional image according to various embodiments of the invention may comprise acquiring at least one image data from a plurality of cameras; determining, from the image data, whether an object is located at least in part in a superposition area; and changing a capture view of the cameras when the object is located at least in part in the superposition area.

An electronic device capable of outputting an omnidirectional image according to various embodiments of the invention may comprise a display; an input device; a communication module configured to communicate with a plurality of cameras; a memory; and a processor electrically connected to the display, the input device, the communication module, and the memory. The memory may store instructions causing, upon execution, the processor to receive image data from the plurality of cameras through the communication module, to generate the omnidirectional image from the image data, to display the omnidirectional image through the display, to receive, through the input device, an input of selecting a main object from among objects contained in the omnidirectional image, to designate the main object, based on the received input of selecting the main object, to determine whether the main object is located in a superposition area, and to transmit a control command for changing a capture view of the plurality of cameras to the plurality of cameras through the communication module when the main object is located at least in part in the superposition area.

According to various embodiments of the present invention, when a user views an omnidirectional image by using a head-mounted device or the like, a capture view of a camera can be changed so that an object seen intensively by the user is not distorted in the image. Therefore, the user can enjoy the omnidirectional image obtained at the changed capture view without reducing the immersion feeling.

According to another embodiment, when changing the capture view of the camera, the electronic device can determine the capture view of the camera in consideration of a movement direction of the object, thereby minimizing the rotation control of the camera and also preventing the image distortion.

DETAILED DESCRIPTION

Figure 1:
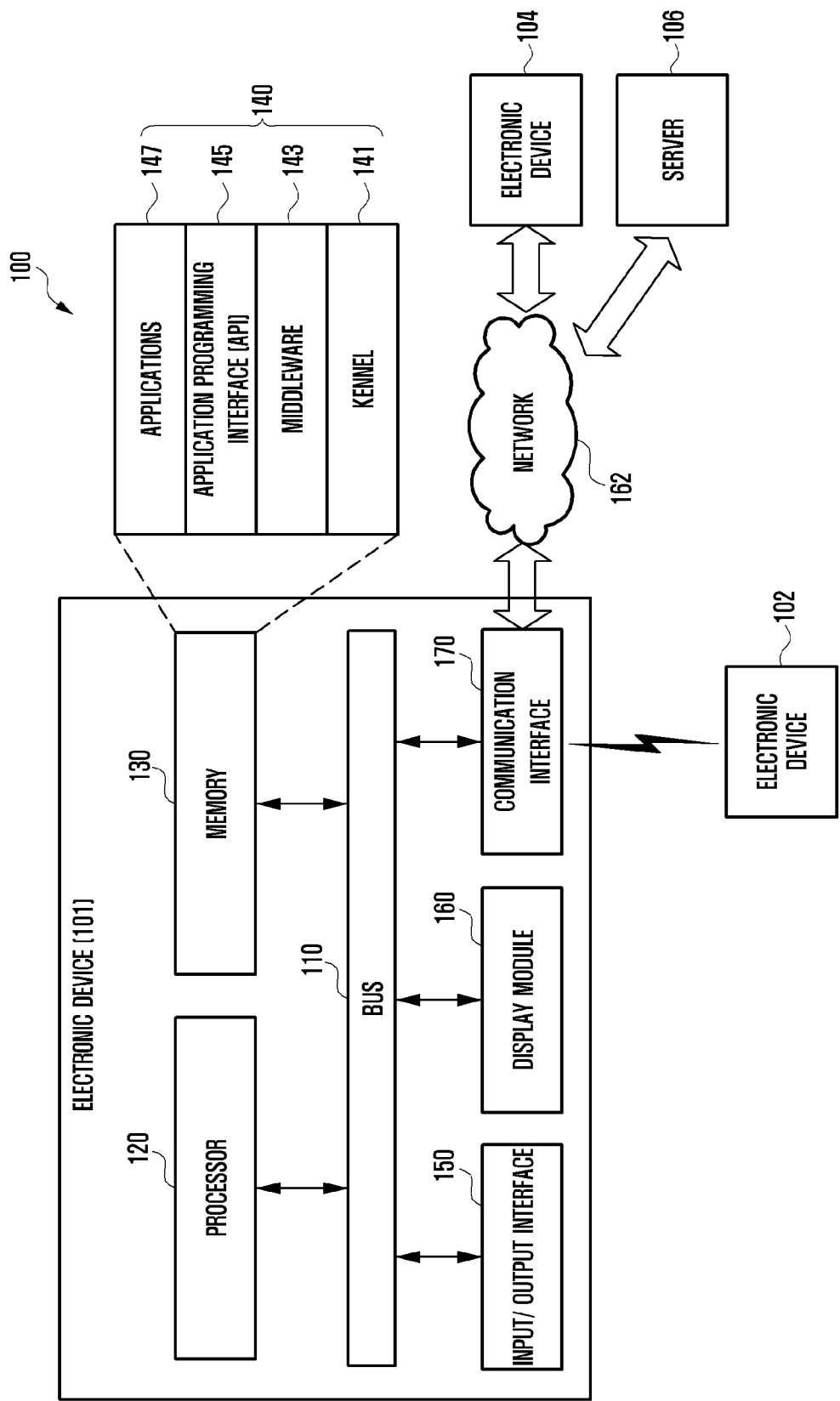
FIG. 1 is a diagram illustrating an electronic device in a network environment according to various embodiments of the present invention.

Now, various embodiments of the present disclosure will be described with reference to the accompanying drawings. However, it should be appreciated that the present disclosure is not limited to particular embodiments and may include various modifications, equivalents, or alternatives for the following embodiments. With regard to the description of the drawings, similar reference numerals may be used to refer to similar or related elements.

In this disclosure, the terms such as "comprise", "include", and "have" denote the presence of stated elements, components, operations, functions, features, and the like, and do not exclude the presence of or a possibility of addition of other elements, components, operations, functions, features, and the like.

In this disclosure, the phrases such as "A or B", "at least one of A and/or B", or "one or more of A and/or B" may include all possible combinations of items enumerated together in a corresponding one of the phrases. For example, "A or B", "at least one of A and B", or "at least one of A or B" may indicate all cases of (1) including at least one A, (2) including at least one B, or (3) including both the at least one A and the at least one B.

In various embodiments, expressions including ordinal numbers, such as "1st", "2nd", "first", "second," etc., are used merely for the purpose to distinguish an element from the other elements without limiting such elements regardless of the sequence and/or importance of the elements.

When a certain element (e.g., first element) is referred to as being "connected" or "coupled" (operatively or communicatively) to another element (e.g., second element), it may mean that the first element is connected or coupled directly to the second element or indirectly through any other element (e.g., third element).

The expression "configured to" may be interchangeably used with any other expressions "suitable for", "having the capacity to", "designed to", "adapted to", "made to", or "capable of". The expression "configured to" may not necessarily mean "specifically designed to". Instead, the expression "device configured to" may mean that the device, together with other devices or components, "is able to". For example, the phrase "processor configured to perform A, B and C" may mean a dedicated processor (e.g., embedded processor) for performing corresponding operations or a generic-purpose processor (e.g., central processing unit (CPU) or application processor (AP)) capable of performing corresponding operations by executing one or more software programs stored in a memory.

The terminology used herein is for the purpose of describing particular embodiments only and is not intended to exclude other embodiments. The singular expressions may include plural expressions unless the context clearly dictates otherwise. Terms used herein, including technical or scientific terms, may have the same meaning as commonly understood by those skilled in the art. Some terms defined in a normal dictionary may be interpreted as having the same or similar meaning as the contextual meanings in the related art. Certain terms are not to be construed as an ideal or overly formal detect unless expressly defined to the contrary herein. In some cases, the terms defined herein cannot be construed to exclude embodiments of the present disclosure.

An electronic device according to various embodiments of this disclosure may include at least one of a smart phone, a tablet personal computer (PC), a mobile phone, a image phone, an e-book reader, a desktop PC, a laptop PC, a netbook computer, a workstation, a server, a personal digital assistant (PDA), a portable multimedia player (PMP), an MP3 player, a portable medical device, a digital camera, or a wearable device. According to various embodiments, the wearable device may include at least one of smart glasses, a head-mounted device (HMD), electronic cloth, an electronic bracelet, an electronic necklace, an electronic appcessory, an electronic tattoo, a smart mirror, or a smart watch.

In some embodiments, the electronic device may be home appliance. For example, the home appliance may include at least one of a TV, a digital image disk (DVD) player, audio equipment, a refrigerator, an air conditioner, a vacuum cleaner, an oven, a microwave, a washing machine, an air cleaner, a set-top box, a home automation control panel, a security control panel, a TV box (e.g., Samsung Home-Sync™, Apple TV™, or Google TV™), a game console (e.g., Xbox™, PlayStation™), an electronic dictionary, an electronic key, a camcorder, or an electronic picture frame.

In another embodiment, the electronic device may include at least one of a medical device (e.g., portable medical measuring equipment (e.g., a blood sugar meter, a heart rate meter, a blood pressure meter, a clinical thermometer, etc.), a magnetic resonance angiography (MRA), a magnetic resonance imaging (MRI), a computed tomography (CT), an ultrasonography, etc.), a navigation device, a global navigation satellite system (GNSS), an event data recorder (EDR), a flight data recorder (FDR), a car infotainment device, electronic equipment for ship (e.g., a marine navigation system, a gyrocompass, etc.), avionics, security equipment, a car head unit, an industrial or home robot, an automated teller machine (ATM), a point of sales (POS), or a device for internet of things (IoT) (e.g., a bulb, a sensor, a sprinkler, a fire alarm, a thermostat, a streetlight, a toaster, athletic equipment, a hot-water tank, a heater, a boiler, etc.).

In a certain embodiment, the electronic device may be include at least one of furniture, a part of a building/construction or car, an electronic board, an electronic signature receiving device, a projector, or various measuring instruments (e.g., a water meter, an electric meter, a gas meter, a wave meter, etc.). In various embodiments, the electronic device may be one of the above-mentioned devices or a combination thereof. The electronic device according to a certain embodiment may be a flexible electronic device. The electronic device according to embodiments disclosed herein is not limited to the above-mentioned devices and may include new electronic devices to be launched with the growth of technology.

Hereinafter, an electronic device according to various embodiments will be described. In this disclosure, the term user may refer to a person or a device (e.g., an artificial intelligence device) using the electronic device.

FIG. 1 is a diagram illustrating an electronic device in a network environment according to various embodiments of the present invention.

FIG. 1 shows an electronic device 101 in a network environment 100 according to various embodiments. The electronic device 100 may include a bus 110, a processor 120, a memory 130, an input/output (I/O) interface 150, a display 160, and a communication interface 170. In a certain embodiment, the electronic device 101 may omit at least one of the above elements or further include any other element.

The bus 110 may be a circuit which interconnects the above elements 120 to 170 and delivers a communication (e.g., a control message and/or data) between the above elements.

The processor 120 may include at least one of a central processing unit (CPU), an application processor (AP), or a communication processor (CP). The processor 120 may execute an operation or data processing for control and/or communication of at least one of other elements.

The memory 130 may include volatile and/or non-volatile memory. The memory 130 may store instructions or data related to at least one element of the electronic device 101. According to an embodiment, the memory 130 may store software and/or programs 140. The programs 140 may include, for example, a kernel 141, a middleware 143, an application programming interface (API) 145, and/or an application program (or application) 147. At least some of the kernel 141, the middleware 143, and the API 145 may be referred to as an operating system (OS).

The kernel 141 may control or manage system resources (e.g., the bus 110, the processor 120, the memory 130, etc.) used to execute operations or functions implemented in other programs (e.g., the middleware 143, the API 145, and the application program 147). Also, the kernel 141 may provide an interface capable of accessing individual elements of the electronic device 101 through the middleware 143, the API 145, or the application program 147, and thereby controlling or managing system resources.

The middleware 143 may perform a function of an intermediary so that the API 145 or the application program 147 communicates with the kernel 143 and thereby exchanges data. In addition, the middleware 143 may process one or more work requests, received from the application program 147, according to priorities. For example, the middleware 143 may assign, to the application program 147, a priority for using system resources (e.g., the bus 110, the processor 120, the memory 130, etc.) of the electronic device 101 and then process the one or more work requests.

The API 145 is an interface through which the application 147 controls a function provided by the kernel 141 or the middleware 143, and may include, for example, at least one interface or function (e.g., instructions) for file control, window control, image processing, character control, and/or the like.

The I/O interface 150 may transmit commands or data, inputted from a user or other external device, to other element(s) of the electronic device 101, or output commands or data, received from other element(s) of the electronic device 101, to a user or other external device.

The display 160 may include, for example, a liquid crystal display (LCD), a light-emitting diode (LED) display, an organic light-emitting diode (OLED) display, a micro-electro-mechanical systems (MEMS) display, or an electronic paper display. The display 160 may display, for example, various contents (e.g., text, image, image, icon, symbol, etc.) to a user. The display 160 may include a touch screen and may receive, for example, a touch, gesture, proximity, or hovering input using an electronic pen or a portion of the user's body.

The communication interface 170 may establish communication between the electronic device 101 and an external device (e.g., a first external electronic device 102, a second external electronic device 104, or a server 106). For example, the communication interface 170 may be connected to the network 162 via wireless or wired communication and communicate with an external device (e.g., the second external electronic device 104 or the server 106).

The wireless communication may include cellular communication using at least one of, for example, LTE, LTE Advance (LTE-A), code division multiple access (CDMA), wideband CDMA (WCDMA), universal mobile telecommunications system (UMTS), wireless broadband (WiBro), global system for mobile communications (GSM), and the like. The wired communication may include at least one of, for example, a universal serial bus (USB), a high definition multimedia interface (HDMI), a recommended standard 232 (RS-232), a power line communication, or a plain old telephone service (POTS). The network 162 may include a telecommunications network, for example, at least one of a computer network (e.g., LAN or WAN), the Internet, or a telephone network.

Each of the first and second external electronic devices 102 and 104 may be similar to or different from the electronic device 101 in types. According to an embodiment, the server 106 may include a group of one or more servers. According to various embodiments, all or part of operations performed in the electronic device 101 may be performed in another electronic device or multiple electronic devices (e.g., the electronic devices 102 and 104 and the server 106). According to an embodiment, in case of having to perform a certain function or service automatically or on demand, the electronic device 101 may request any other electronic device (e.g., the electronic device 102 or 104 or the server 106) to perform at least part of the function or service rather than or in addition to autonomously performing the function or service. Then, the other electronic device (e.g., the electronic device 102 or 104 or the server 106) may perform the requested function or service and return a result to the electronic device 101. The electronic device 101 may provide the requested function or service by using or further processing the received result. For this, cloud computing technique, distributed computing technique, or client-server computing technique may be utilized for example.

Figure 2:
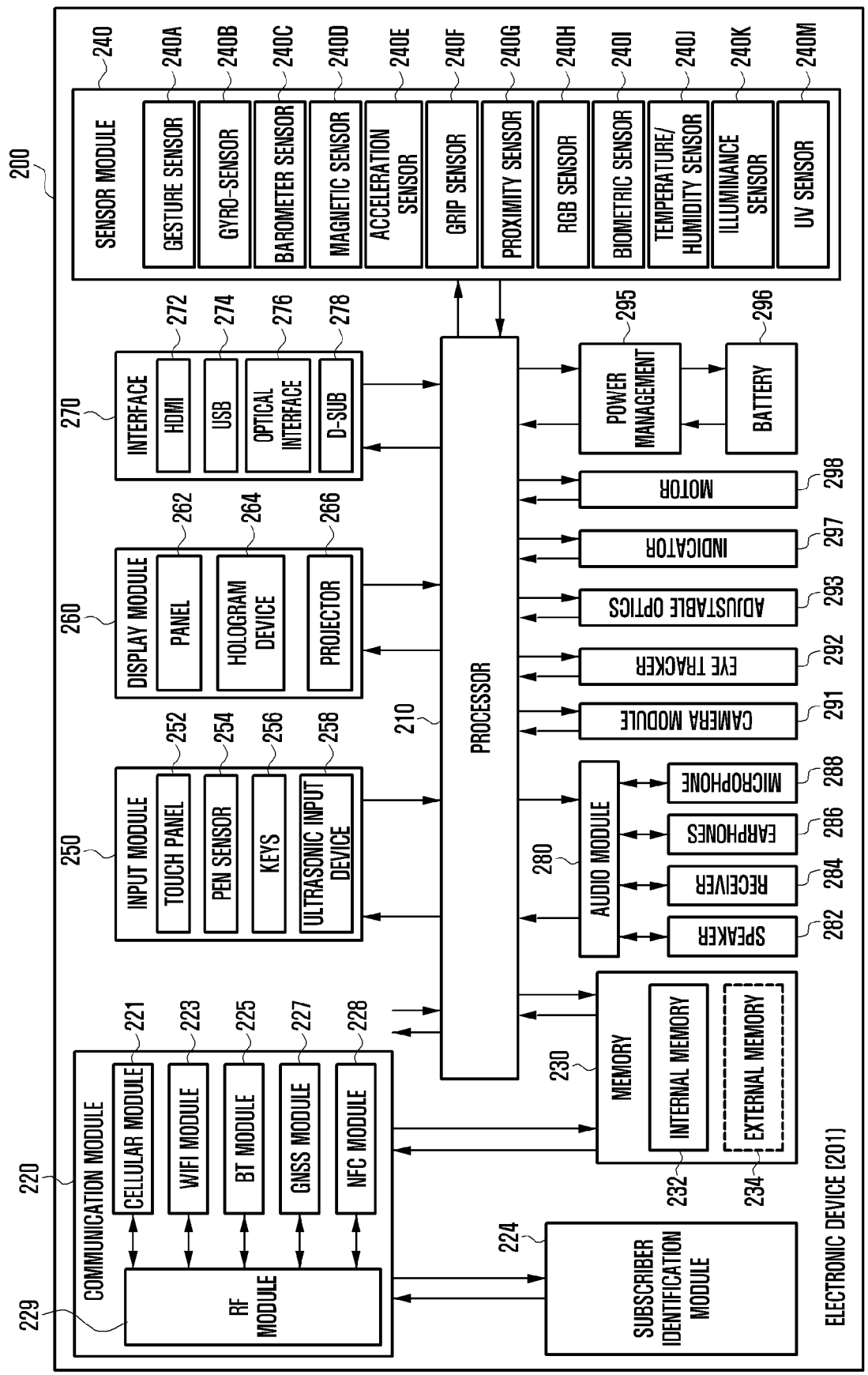
FIG. 2 is a block diagram illustrating an electronic device according to various embodiments of the present invention.

FIG. 2 is a block diagram illustrating an electronic device 201 according to embodiments. The electronic device 201 may include, for example, the whole or part of the electronic device 101 shown in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may execute an operating system (OS) or an application program, control multiple hardware or software components connected to the processor 210, and perform processing and operations on various data. The processor 210 may be implemented by, for example, a system on chip (SoC). According to an embodiment, the processor 210 may further include a graphic processing unit (GPU) and/or an image signal processor. The processor 210 may include at least some of elements shown in FIG. 2 (e.g., a cellular module 221). The processor 210 may load and process instructions or data received from at least one of the other elements (e.g., non-volatile memory) into volatile memory and then store the resulting data in non-volatile memory.

The communication module 220 may be, for example, the communication module 170 shown in FIG. 1. The communication module 220 may include, for example, a cellular module 221, a Wi-Fi module 223, a Bluetooth (BT) module 225, a GNSS module 227, an NFC module 228, and a radio frequency (RF) module 229.

The cellular module 221 may provide a voice call, a image call, a messaging service, or an Internet service, for example, through a communication network. According to an embodiment, the cellular module 221 may utilize the subscriber identity module (e.g., a SIM card) 224 to perform the identification and authentication of the electronic device 201 in the communication network. According to an embodiment, the cellular module 221 may perform at least some of functions that the processor 210 may provide. According to an embodiment, the cellular module 221 may include a communications processor (CP).

Each of the WiFi module 223, the Bluetooth module 225, the GNSS module 227, and the NFC module 228 may include a processor for processing data transmitted or received therethrough. According to a certain embodiment, at least some (e.g., two or more) of the cellular module 221, the WiFi module 223, the Bluetooth module 225, the GNSS module 227, or the NFC module 228 may be included in an integrated chip (IC) or an IC package.

The RF module 229 may, for example, transmit and receive communication signals (e.g., RF signals). The RF module 229 may include, for example, a transceiver, a power amplifier module (PAM), a frequency filter, a low noise amplifier (LNA), or an antenna. According to another embodiment, at least one of the cellular module 221, the WiFi module 223, the Bluetooth module 225, the GNSS module 227, or the NFC module 228 may transmit and receive RF signals through separate RF modules.

The SIM 224 may include, for example, a card having SIM or an embedded SIM, and may include unique identification information (e.g., an integrated circuit card identifier (ICCID), or an international mobile subscriber identity (IMSI)).

The memory 230 (e.g., the memory 130 shown in FIG. 1) may include an internal memory 232 and an external memory 234. The internal memory 232 may include, for example, at least one of a volatile memory (e.g., a DRAM, an SRAM, or SDRAM), and a non-volatile memory (e.g., a one time programmable ROM (OTPROM), a PROM, an EPROM, an EEPROM, a mask ROM, a flash ROM, a flash memory, a hard drive, or a solid state drive (SSD)).

The external memory 234 may include a flash drive, for example, a compact flash (CF), a secure digital (SD), a micro-SD, a mini-SD, an extreme Digital (xD), or a memory stick. The external memory 234 may be functionally or physically connected to the electronic device 201 through various interfaces.

The sensor module 240 may, for example, measure a physical quantity or detect an operating state of the electronic device 201 and convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green and blue) sensor), a biometric sensor 240I, a temperature/humidity sensor 240J, an illuminance sensor 240K, a ultra violet (UV) sensor 240M, or an earth magnetic field sensor 240N.

According to an embodiment, at least some components of sensor module 240 may be included in another electronic device (e.g., a terminal) which is detachably attachable to the electronic device 201.

According to an embodiment, the wearable electronic device 201 may detect an IR, a pressure, or a change in capacitance (or permittivity) caused by user's wearing, thereby determining whether the user wears the wearable electronic device.

The gesture sensor 240A may sense a gesture or motion of a user's hand or finger and then regard a sensing result as an input action of the electronic device 201.

Additionally or alternatively, the sensor module 240 may include, for example, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In a certain embodiment, the electronic device 201 further includes a processor configured to control the sensor module 240, either as part of the processor 210 or separately, to control the sensor module 240 while the processor 210 is in a sleep state.

An eye tracker 292 may track a user's gaze by using, for example, at least one of an electrical oculography (EOG) sensor, a coil system, a dual purkinje system, a bright pupil system, and a dark pupil system. In addition, the eye tracker may further include a micro camera for gaze tracking.

An adjustable optics 293 may measure an inter-pupil distance (IPD) of the user and thereby adjust a lens distance and a position of the display 260 of the electronic device 201 so that the user can view a image suitable for his or her eyesight.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. The touch panel 252 may further include a tactile layer and offer a tactile feedback to the user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 through an input tool that generates ultrasonic signals, thus allowing wireless recognition.

The display 260 (e.g., the display 160) may include a panel 262, a hologram 264, a projector 266, and/or a control circuit for controlling them. The panel 262 may have a flexible, transparent or wearable form. The panel 262 may be formed of a single module with the touch panel 252. In a certain embodiment, the panel 262 may include a pressure sensor (or a force sensor which will be interchangeably used hereinafter) capable of measuring a pressure of a user's touch. The pressure sensor may be incorporated into the touch panel 252 or formed separately from the touch panel 252. The hologram 264 may show a stereoscopic image in the air using interference of light. The projector 266 may project an image onto a screen, which may be located at the inside or outside of the electronic device 201.

The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least parts of the audio module 280 may be included, for example, in the I/O interface 145 shown in FIG. 1. The audio module 280 may process sound information inputted or outputted through a speaker 282, a receiver 284, an earphone 286, or a microphone 288.

The camera module 291 is a device capable of acquiring still images and moving images. According to an embodiment, the camera module 291 may include at least one image sensor (e.g., a front sensor or a rear sensor), a lens, an image signal processor (ISP), or a flash (e.g., LED or xenon lamp).

The power management module 295 may manage electric power of the electronic device 201. Although not shown, the power management module 295 may include, for example, a power management integrated circuit (PMIC), a charger IC, or a battery or fuel gauge. The PMIC may have wired and/or wireless charging types. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Image Broadcasting), or mediaFlo™.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
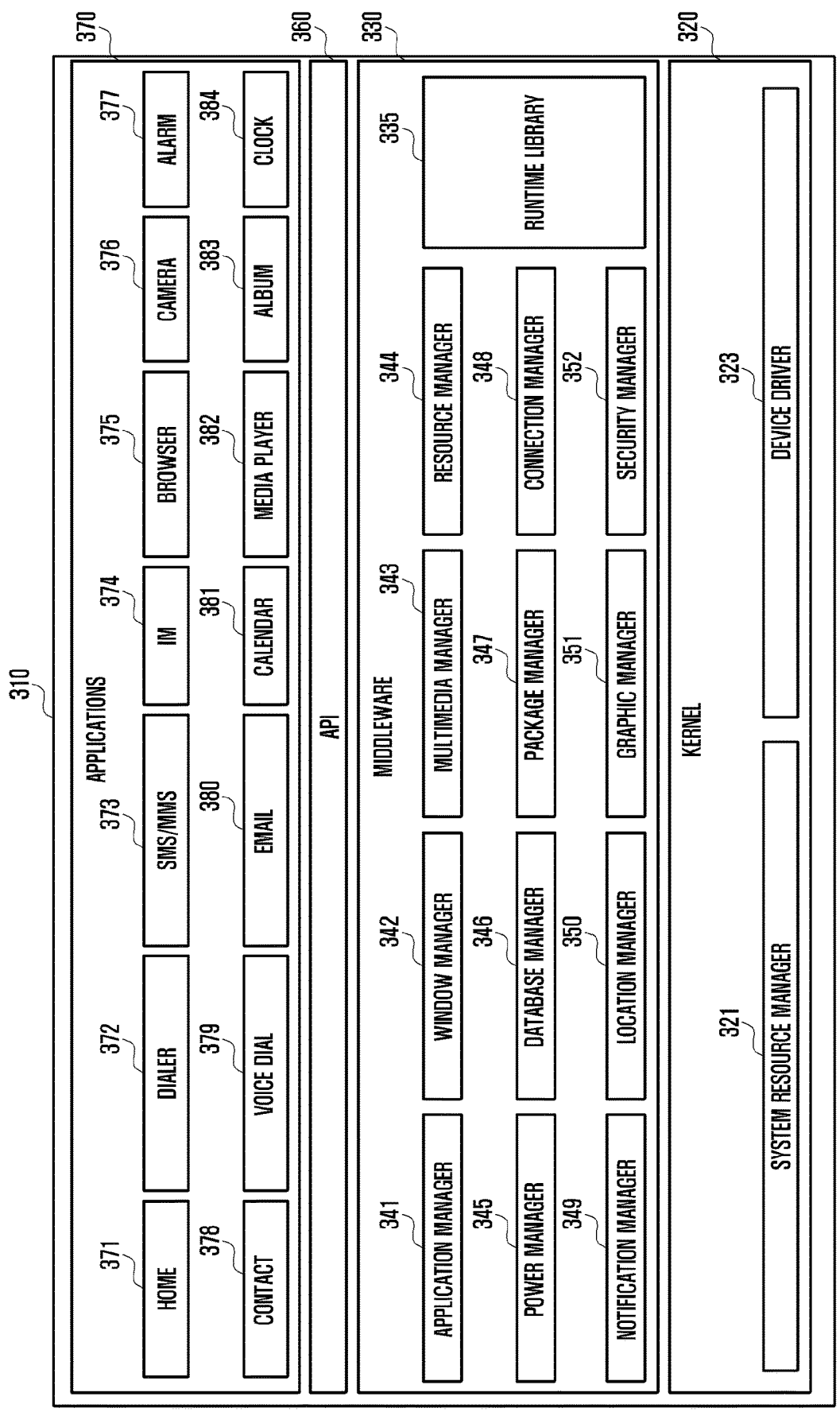
FIG. 3 is a block diagram illustrating a program module according to various embodiments of the present invention.

FIG. 3 is a block diagram illustrating a program module according to various embodiments. According to one embodiment, the program module 310 (e.g., the program 140) may include an OS controlling resources related to an electronic device (e.g., the electronic device 101) and/or various applications (e.g., the application program 147) executed in the OS. For example, the OS may be Android™, iOS™, Windows™, Symbian™, Tizen™, Bada™, and the like.

The program module 310 may include a kernel 320 (e.g., the kernel 141), a middleware 330 (e.g., the middleware 143), an API 360 (e.g., the API 145), and/or the application 370 (e.g., the application program 147). At least a part of the program module 310 may be preloaded in the electronic device or downloaded from an external electronic device (e.g., the electronic device 102, 104 or the server 106).

The kernel 320 may include a system resource manager 321 and/or a device driver 323. The system resource manager 321 may perform the control, allocation, recovery, and/or the like of system resources. According to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment, when the electronic device (e.g., the electronic device 101) has a telephone function, the middleware 330 may further include a telephony manager for managing a voice telephony call function and/or a image telephony call function of the electronic device.

The middleware 330 may include a middleware module for forming various functional combinations of the above-described elements. The middleware 330 may provide modules specialized according to types of OSs in order to provide differentiated functions. Also, the middleware 330 may dynamically delete some of the existing elements, or may add new elements.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, or at least one application capable of performing functions such as health care (e.g., measurement of exercise amount or blood glucose) or environmental information provision (e.g., providing information about air pressure, humidity, temperature, or the like).

According to an embodiment, the applications 370 may include an application (hereinafter, referred to as "information exchange application") that supports the exchange of information between the electronic device and an external electronic device. The information exchange application may include, for example, a notification relay application for delivering specific information to the external electronic device, or a device management application for managing the external electronic device.

For example, the notification relay application may have a function of sending notification information generated in other applications (e.g., the SMS/MMS application, the email application, the healthcare application, or the environmental information application) of the electronic device to the external electronic device. Further, the notification relay application may receive notification information from the external electronic device and provide it to the user.

The device management application may manage (e.g., install, delete, or update) at least one function (e.g., turn-on/turn-off of the external electronic device itself or some components thereof or adjusting the brightness or resolution of the display) of the external electronic device, at least one application running in the external electronic device, or at least one service (e.g., a call service or a message service) provided in the external electronic device.

According to an embodiment, the applications 370 may include an application (e.g., a healthcare application of a mobile medical device, etc.) designated depending on the attributes of the external electronic device. According to one embodiment, the applications 370 may include an application received from the external electronic device. According to one embodiment, the applications 370 may include a preloaded application or a third party application downloadable from a server. The names of elements of the program module 310 according to the illustrated embodiment may be varied depending on the type of the operating system.

According to various embodiments, at least a part of the program module 310 may be implemented in software, firmware, hardware, or a combination thereof. At least a part of the program module 310 may be implemented (e.g., executed) by, for example, a processor (e.g., 210). At least a part of the program module 310 may include, for example, modules, programs, routines, sets of instructions, or processes to perform one or more functions.

Figure 4A:
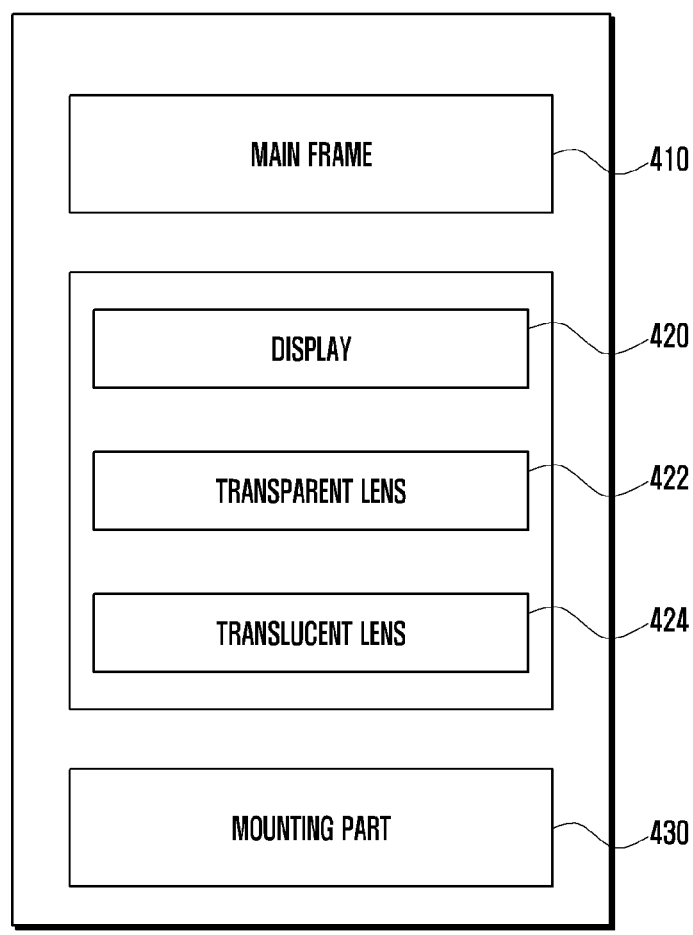
FIG. 4A is a block diagram illustrating a configuration of a head mounted device according to various embodiments of the present invention.
Figure 4B:
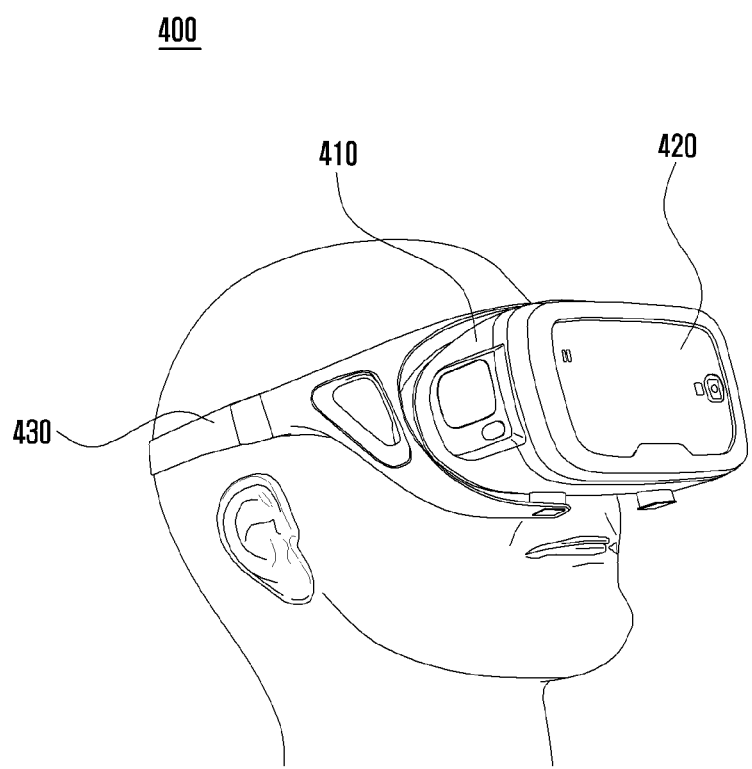
FIG. 4B is a diagram illustrating a state of wearing a head-mounted device various embodiments of the present invention.

FIG. 4A is a block diagram illustrating a configuration of a head mounted device (HMD) 400 according to various embodiments of the present invention, and FIG. 4B is a diagram illustrating a state of wearing the HMD 400.

According to various embodiments, the HMD 400 may include a main frame 410, at least one of a display 420, a transparent lens 422, or a translucent lens 424 each of which may be attached to the main frame 410, and a mounting part (e.g., a band) 430 for fixing the main frame 410 to the head. Optionally, a user interface (not shown) may be included.

The HMD 400 may be worn on a portion of the user's body by using various kinds of mounting parts 430. In one embodiment, the mounting part 430 may include a band formed of an elastic material, so that the main frame 410 may be closely contacted around the user's eyes. In other embodiments, the mounting part 430 may include eyeglass temples, helmets, or straps.

According to various embodiments, some components of the HMD 400 may be configured in the form of being detachable. For example, the display (e.g., a terminal) may be attachable to and detachable from the main frame 410. In this case, the main frame 410 may have a space or structure capable of accommodating the terminal.

The main frame 410 may further include a connector for coupling to an electrical part of the display to allow communication with the display. Thus, the main frame 410 may provide a signal of a user interface to the display through the connector and the electrical part.

According to an embodiment, a lens assembly may be further included between the display 420 and the user's eye.

According to various embodiments, the main frame 410 may include a touch panel as a user interface. The touch panel may have one or more display position adjusters or lens adjusters (not shown) on the outer surface of the main frame 410.

In another embodiment, the main frame 410 may include any other type control device for controlling the terminal on its side. This control device may have, for example, at least one of a physical key, a physical button, a touch key, a joystick, a wheel key, or a touch pad.

The touch pad may display a graphical user interface (GUI) for controlling functions of the terminal. In an embodiment, the touch pad may receive a user's touch input (a direct touch input or a hovering input).

The main frame 410 may be connected to the terminal through an interface such as a USB and thereby transmit the touch input, received by the touch pad, to the terminal. Then, in response to the touch input, the terminal may control a function corresponding to the touch input. For example, the terminal may adjust the volume or image playback in response to the received touch input.

Figure 5:
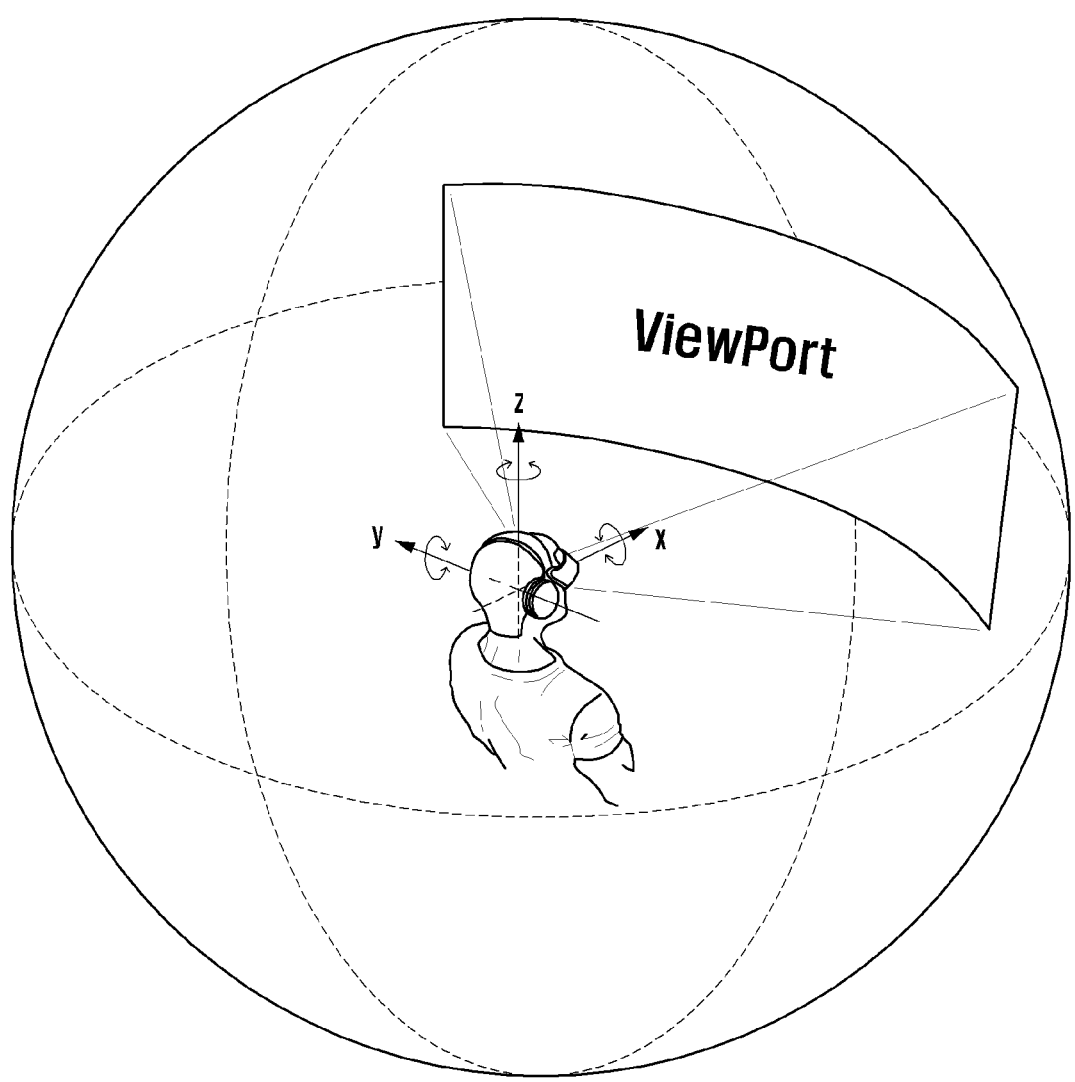
FIG. 5 is a diagram illustrating a view port provided to a user wearing a head mounted device according to various embodiments of the present invention.

FIG. 5 is a diagram illustrating a view port provided to a user wearing the HMD 400 according to various embodiments of the present invention.

According to various embodiments, the HMD 400 may form a view port in a real or virtual environment, and may output, in connection with the view port, images of actual external objects, virtual objects, or related data through the display 420 of the HMD 400.

According to various embodiments, the HMD 400 may provide at least one of a see-through function for offering augmented reality (AR) or a see-closed function for offering virtual reality (VR).

For example, according to the see-through function, the HMD 400 may deliver the actual image of external object(s) to the user's eyes through the display 420 or the transparent/translucent lens 422 or 424 and also visually offer related actual or virtual information to the user.

For example, the HMD 400 may provide the user with additional information and images about things actually seen. In another embodiment, the HMD 400 may provide additional information to the user by using the display 420, the lens 422 or 424, hologram, and/or the like.

In another example, according to the see-closed function, the HMD 400 may include at least one display 420 disposed in front of the user's eyes so that the user can see content (game, movie, streaming, broadcast, etc.) provided through the display 420.

For example, the HMD 400 outputs separate screens to the user's eyes through the display 420 and thereby provide a feeling of immersion to the user. For example, the HMD 400 may block the actual image of external object and deliver only the screen provided by the display to the user's eyes.

Figure 6:
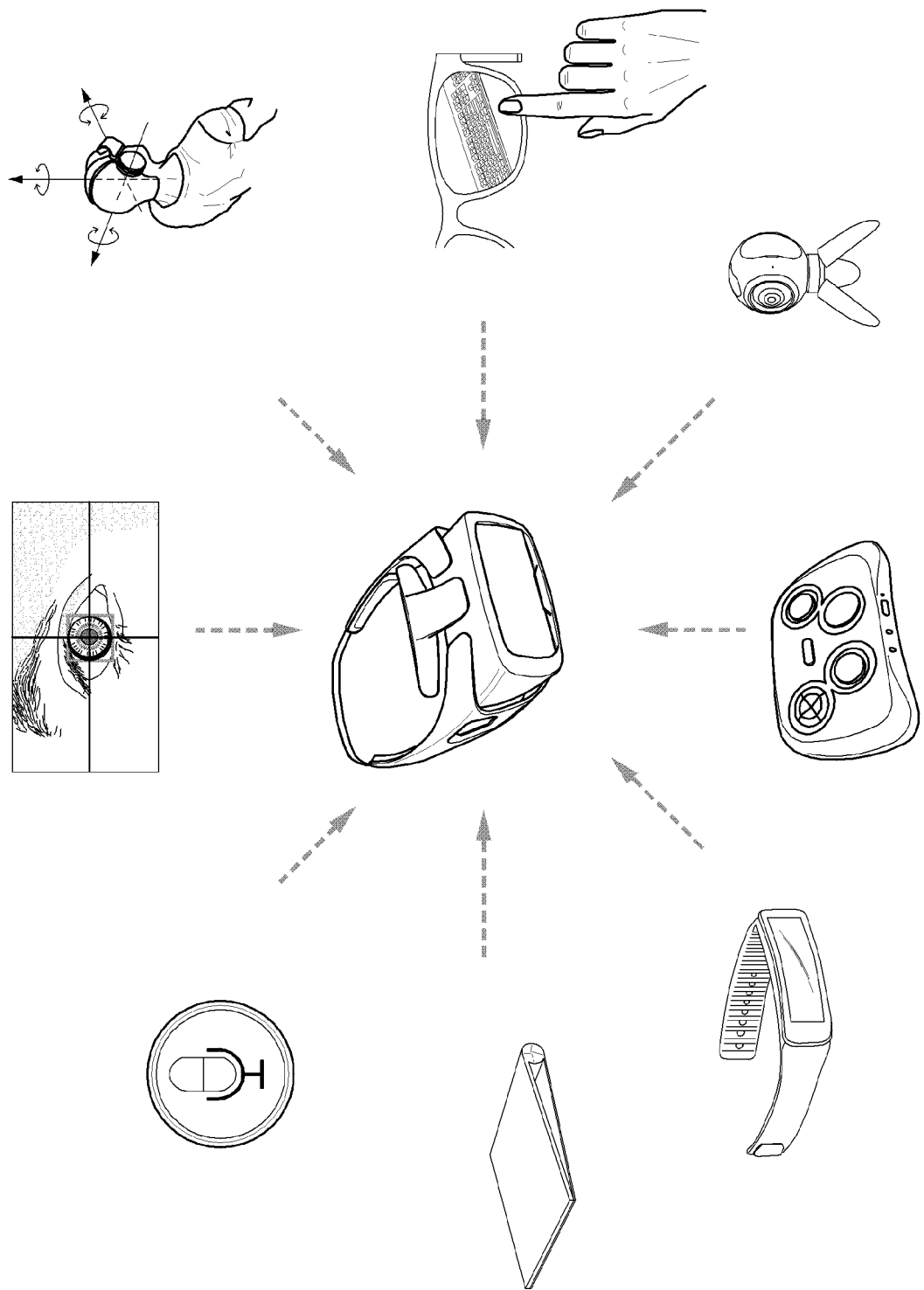
FIG. 6 is a diagram illustrating user input members for a head mounted device according to various embodiments of the present invention.

FIG. 6 is a diagram illustrating user input members for the HMD 400 according to various embodiments of the present invention.

According to various embodiments, the HMD 400 may receive input information by using a component (e.g., the audio module 280, the eye tracker 292, etc.) of the HMD 400.

According to another embodiment, the HMD 400 may receive input information from an external device connected to the communication module 220 by using the communication module 220.

For example, the HMD 400 may receive a user voice input through the audio module 280. For example, the audio input through the microphone 288 may be extracted as audio information through a codec.

For example, the HMD 400 may detect the motion of the user's eye by using the eye tracker 292. For example, the eye tracker 292 may include a light emitter capable of outputting light and a light receiver capable of receiving and recognizing light.

For example, using the light emitter and the light receiver, the eye tracker 292 may acquire eye motion information based on light reflected from the eye and then received.

According to various embodiments, the HMD 400 may detect the motion of the user's head by using the acceleration sensor 240E, the gyro sensor 240B, or the geomagnetic sensor 240N.

According to various embodiments, the HMD 400 may acquire the motion information of the user's hand or finger by using the camera module 291 and/or the gesture sensor 240A.

According to various embodiments, the HMD 400 may acquire the motion information of the user through various components included in the HMD 400, and may recognize at least one of the acquired motion information as an input signal received from the user. For example, using the acquired motion information of the user, the HMD 400 may control a virtual input device output from the HMD 400.

According to various embodiments, the HMD 400 may establish a wired or wireless connection with any other electronic device (e.g., a touchpad, a smart watch/ring, a joystick, a gamepad, etc.) and thereby receive a user input from the connected electronic device.

For example, the HMD 400 may receive key input data from the gamepad and receive touch input data from the smart watch.

According to various embodiments, the HMD 400 may receive data from any other electronic device connected thereto through a wired (e.g., USB) or wireless (e.g., Bluetooth, WiFi) communication module and recognize the received data as an input signal received from the user.

For example, the HMD 400 may receive captured image data from an external camera device connected thereto. For example, the HMD 400 may receive an omnidirectional image from an external device (e.g., an electronic device including a plurality of cameras) via the communication module and then provide the received omnidirectional image to the user via the display.

Although not shown, in various embodiments, by using ultrasonic waves or electric field, the HMD 400 may acquire distance information or positional relationship information with any other electronic device connected thereto. For example, the HMD 400 may recognize the acquired distance information or positional relationship information as an input signal received from the user.

For example, the HMD 400 may detect the ultrasonic waves output from other electronic device by using at least two microphones and then extract relative coordinates between the HMD 400 and the other electronic device by using the detected ultrasonic waves. For example, the HMD 400 may use the extracted relative coordinates as an input signal received from the user.

Figure 7A:
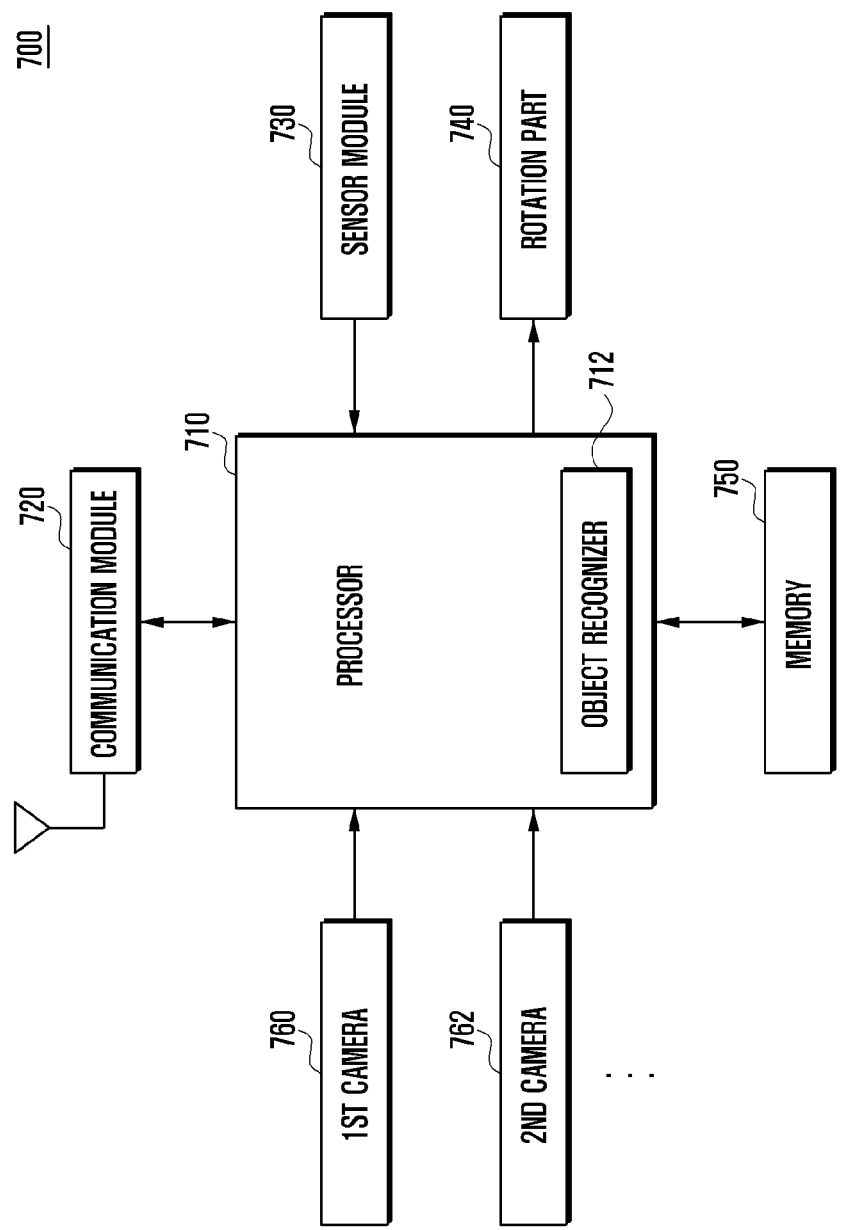
FIG. 7A is a block diagram illustrating a configuration of an electronic device for acquiring an omnidirectional image according to various embodiments of the present invention.
Figure 7B:
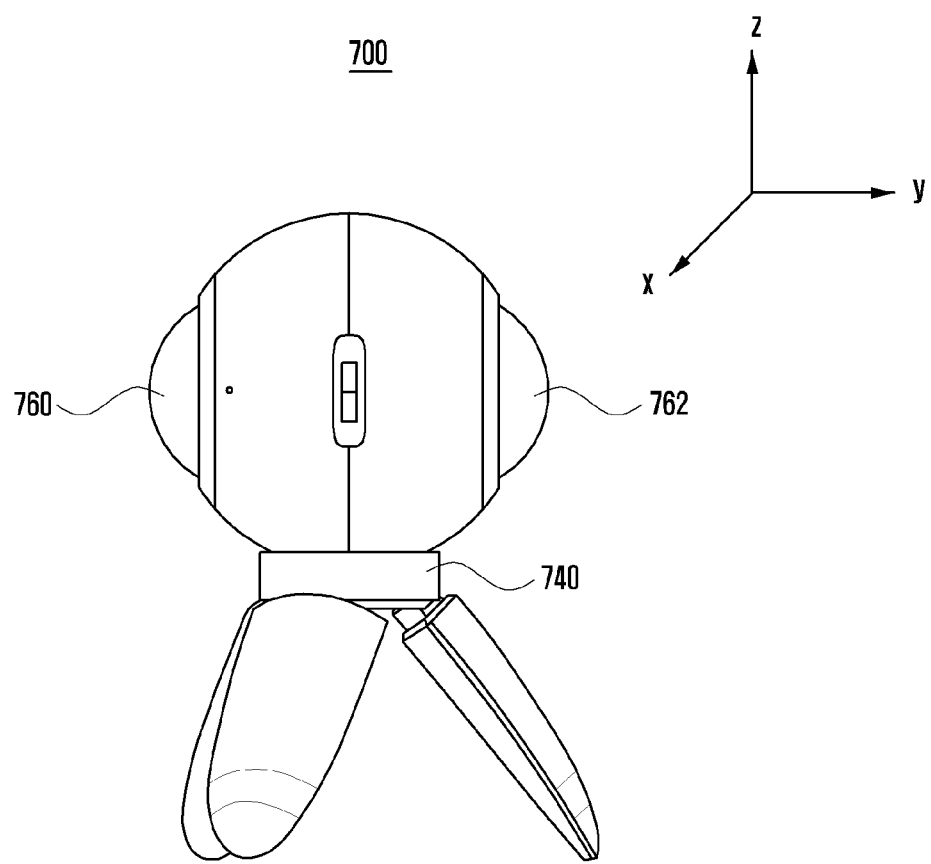
FIGS. 7B and 7C are diagrams respectively illustrating lateral and upper sides of an electronic device for acquiring an omnidirectional image according to various embodiments of the present invention.
Figure 7C:
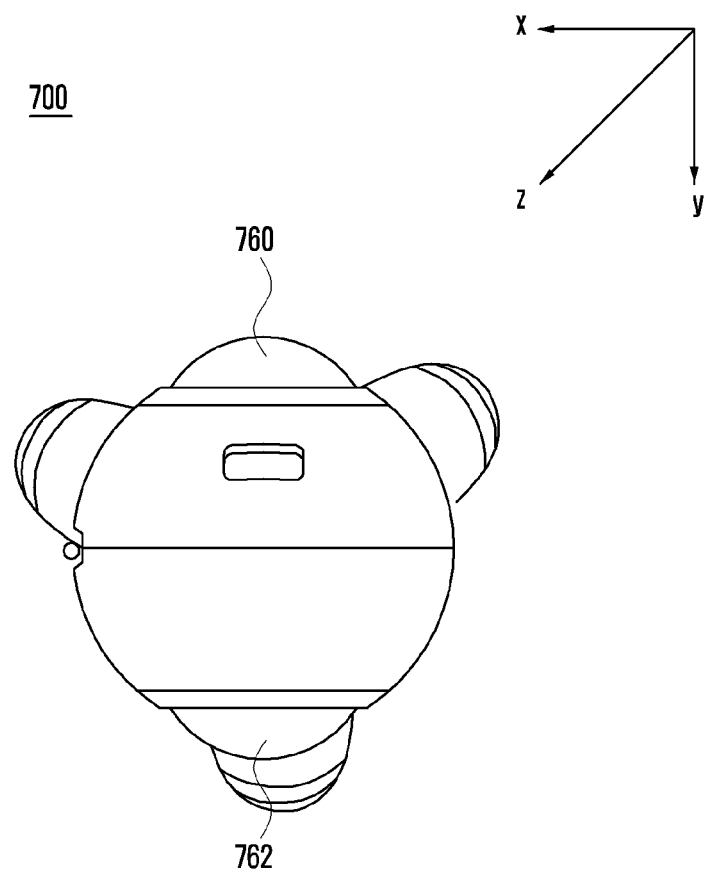

FIGS. 7A to 7C are diagrams illustrating an electronic device 700 capable of acquiring an omnidirectional image according to various embodiments of the present invention.

Referring to FIG. 7A, the electronic device 700 according to various embodiments may include cameras (e.g., a first camera 760, a second camera 762, etc.), a processor 710 including an object recognizer 712, a communication module 720, a sensor module 730, a rotation part 740, and a memory 750.

According to various embodiments, the electronic device 700 may acquire input information or information about an object through the sensor module 730. For example, the sensor module 760 may acquire horizontal and vertical information of the cameras 760 and 762. For example, using the geomagnetic sensor 240N, the sensor module 760 may acquire capture direction (or capture view) information of the camera or direction information (east, west, north, south) of a specific object.

For example, the electronic device 700 may include the microphone 288 for acquiring ambient sound information. For example, the electronic device 700 may include the proximity sensor 240G for detecting the proximity of an object.

According to various embodiments, the memory 750 may store data acquired by the cameras 760 and 762 and the sensor module 730 or may store data for driving the electronic device 700.

According to various embodiments, the rotation part 740 may include a rotation part for rotating the camera, a rotation part for rotating the body of the electronic device 700, or a rotation part formed like a gym-ball. The rotation part 740 according to various embodiments may change the capture direction (or capture view) of the camera to various orientations.

According to various embodiments, the processor 710 may include the object recognizer 712. For example, the object recognizer 712 may recognize an object by using data acquired from the cameras 760 and 762 or the sensor module 730. For example, the processor 710 may recognize an object on an image through the object recognizer 712 and control a rotation operation of the camera through the rotation part 740. For example, the main capture view of the camera may be changed according to the rotation operation of the camera.

According to various embodiments, by using data acquired from the cameras 760 and 762 or the sensor module 730, the processor 710 may determine whether an object on the image is located in a superposition area 810.

According to another embodiment, by using the acquired data, the processor 710 may identify a distance 1010 between the electronic device 700 and the object.

According to various embodiments, the electronic device 700 may communicate with an external electronic device by using the communication module 720. For example, the electronic device 700 may transmit image data or stitched omnidirectional image to the external electronic device through the communication module 720. For example, the transmitted image data or omnidirectional image may be outputted through the output device (e.g., the display) of the HMD 400.

The communication module 720 may include, for example, the cellular module 221, the WiFi module 223, the Bluetooth module 225, the GPS module 227, the NFC module 228, and the RF module 229.

According to various embodiments, the electronic device 700 may include at least two cameras 760 and 762.

According to various embodiments, the main capture direction (or main capture view) of the plurality of cameras 760 and 762 may be set differently for each camera. For example, using the plurality of cameras 760 and 762 having different main capture directions, the electronic device 700 may take an omnidirectional (360 degrees) image in one shot.

Figure 8A:
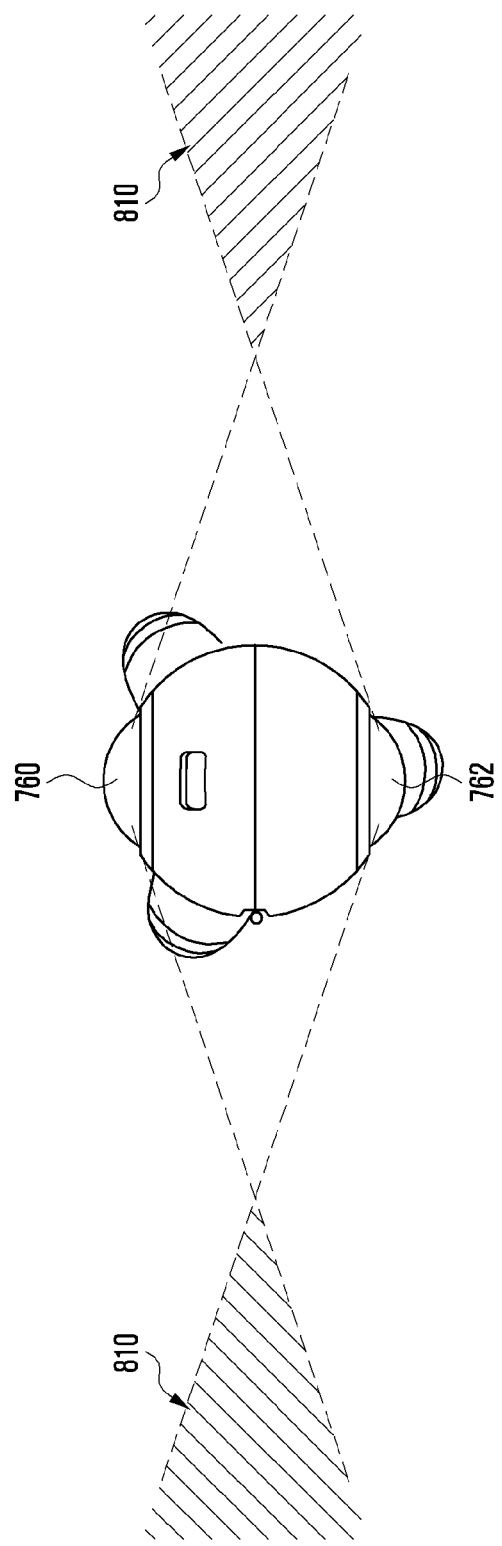
FIGS. 8A and 8B are diagrams illustrating a superposition area caused by cameras of an electronic device according to various embodiments of the present invention.
Figure 8B:
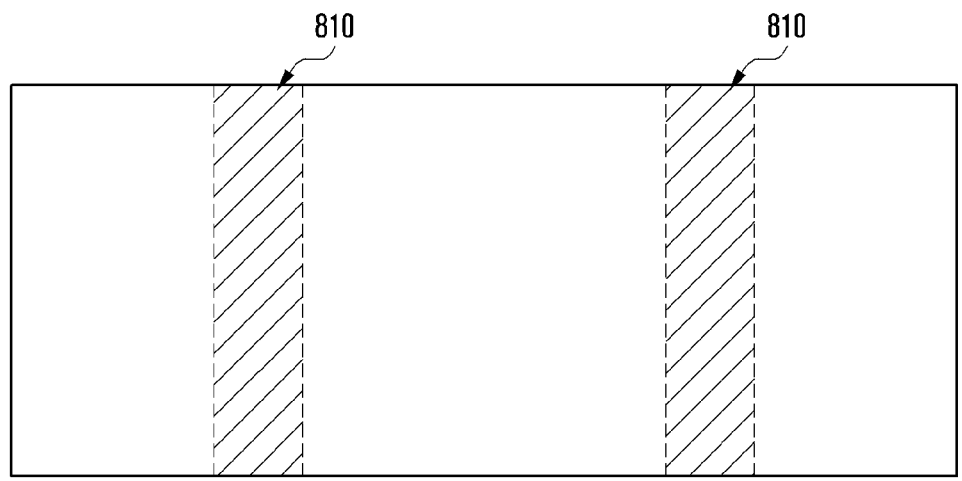

FIGS. 8A and 8B are diagrams illustrating a superposition area 810 caused by a plurality of cameras of an electronic device 700 according to various embodiments of the present invention.

According to various embodiments, the plurality of cameras 760 and 762 may have the main capture views which are set differently. Therefore, when all of photographable areas of the cameras are added, it is possible to cover an omnidirectional area.

According to various embodiments, the electronic device 700 may include three or more cameras, but the following embodiment will be described using two cameras to capture an omnidirectional image.

For example, the electronic device 700 may acquire the omnidirectional image with one shot by using the first camera 760 and the second camera 762 each of which realize an angle of view of 180 degrees or more.

According to various embodiments, in order to realize the omnidirectional image (i.e., 360-degree image) through the plurality of cameras 760 and 762, the photographable areas of the cameras may have a superposition area 810. For example, as shown in FIG. 8A, there may be at least two superposition areas 810 caused by the overlap between a photographable area of the first camera 760 and a photographable area of the second camera 762.

According to various embodiments, the electronic device 700 may acquire the omnidirectional image (i.e., 360-degree image) by stitching (i.e., compositing) the images captured by the plurality of cameras.

Referring to FIG. 8B, the omnidirectional image acquired through stitching may have at least two superposition areas 810, on the image, corresponding to the superposition areas 810 shown in FIG. 8A.

Figure 9:
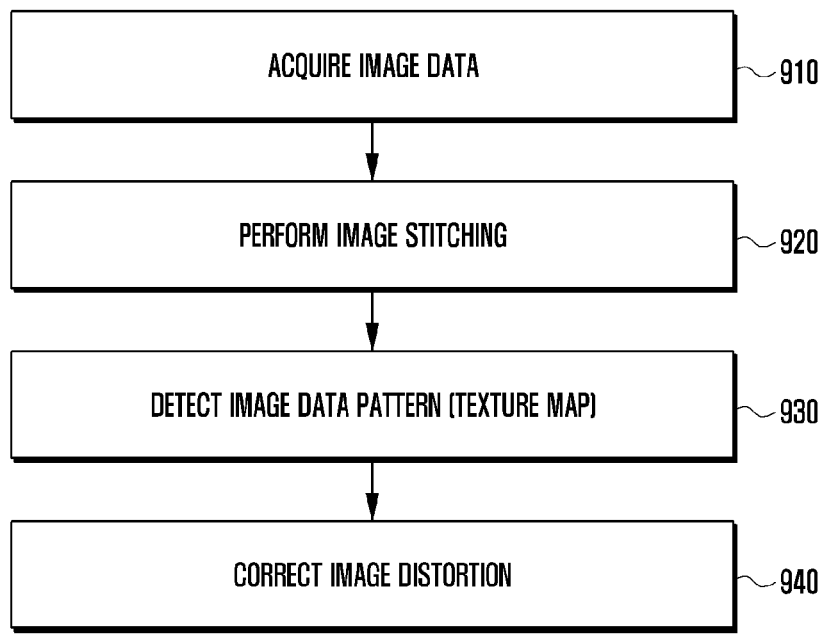
FIG. 9 is a flow diagram illustrating operations of acquiring an omnidirectional image according to various embodiments of the present invention.

FIG. 9 is a flow diagram illustrating operations of acquiring an omnidirectional image according to various embodiments of the present invention.

Referring to FIG. 9, the electronic device 700 according to various embodiments may acquire image data through the plurality of cameras 760 and 762, respectively.

According to various embodiments, at operation 910, the plurality of cameras 760 and 762 may acquire captured image data for different areas. For example, the electronic device 700 may acquire a first image through the first camera 760 and also acquire a second image through the second camera 762. Here, the first image and the second image may contain the superposition area 810.

According to various embodiments, at operation 920, the processor 710 may stitch image data acquired by the plurality of cameras 760 and 762. For example, the processor 710 may identify the superposition areas in the acquired images, derive a correlation for each image in the superposition area, find corresponding matching points in the images, and stitch the image data.

According to various embodiments, at operation 930, the processor 710 may detect an image correction pattern (or image data pattern or texture map) suitable for the superposition area 810.

According to various embodiments, at operation 940, the processor 710 may apply the detected image correction pattern to the superposition area 810 and thereby correct image distortion to generate an omnidirectional image (360-degree image).

Figure 10:
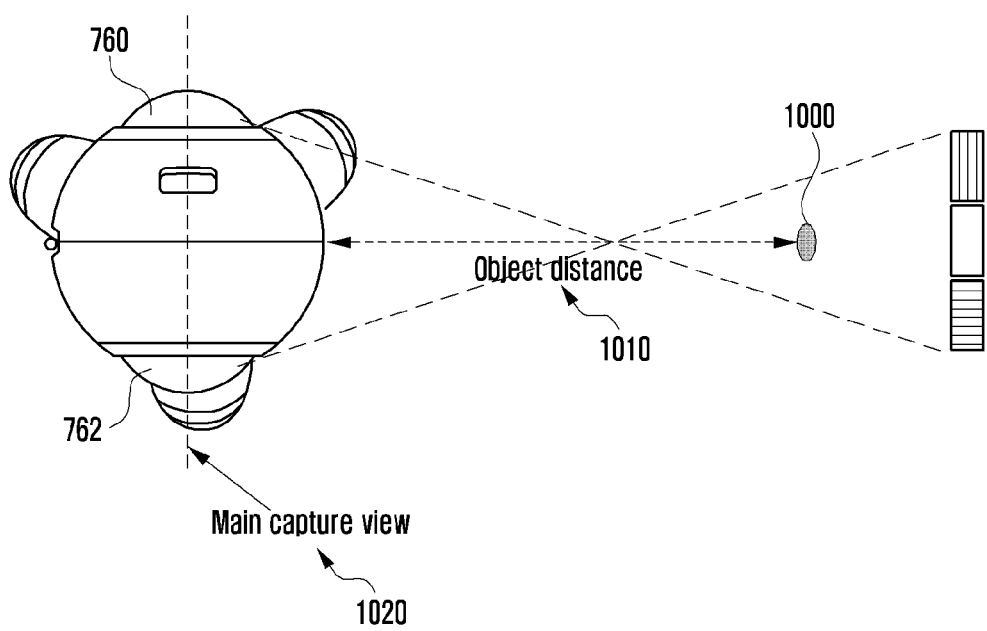
FIG. 10 is a diagram illustrating an image distortion phenomenon in operations of acquiring an omnidirectional image according to various embodiments of the present invention.

FIG. 10 is a diagram illustrating an image distortion phenomenon in operations of acquiring an omnidirectional image (360-degree image) at an electronic device 700 according to various embodiments of the present invention.

According to various embodiments, the omnidirectional image acquired at the electronic device 700 may include a distorted image area. For example, in the acquired image areas, image distortion phenomena such as a misaligned object image, a double image, and a disappearance of image may occur.

For example, the image distortion may occur when an object 1000 is located in the superposition area 810 caused by the overlap of the photographable areas of the plurality of cameras 760 and 762.

For example, the image distortion may occur because the cameras have different main capture views 1020.

According to various embodiments, in the electronic device 700 including the first camera 760 and the second camera 762 as shown in FIG. 10, the first camera 760 and the second camera 762 may have different main capture views 1020 opposite to each other on the same axis.

For example, when the object 1000 exists in the superposition area 810, an image of the object 1000 captured by the first camera 760 may be different in part from an image of the object 1000 captured by the second camera 762. For example, when stitching different images of the same object 1000, the image distortion may occur in the omnidirectional image.

For example, when the image stitching is performed based on a long distance, the image distortion in the omnidirectional image generated through the stitching may occur more greatly as an object distance 1010 between the object 1000 and the electronic device 700 is closer.

For example, the image distortion in the omnidirectional image may occur when the object located in the superposition area 810 is closer than a threshold.

In order to solve such image distortion problems, the electronic device 700 according to various embodiments of the present invention may change the main capture view 1020 of the camera at the time of capture.

According to another embodiment, in order to minimize the image distortion in the superposition area 810, the plurality of cameras 760 and 762 may perform capturing with the same camera setting such as exposure, white balance, horizontal, vertical, and focus.

Figure 11A:
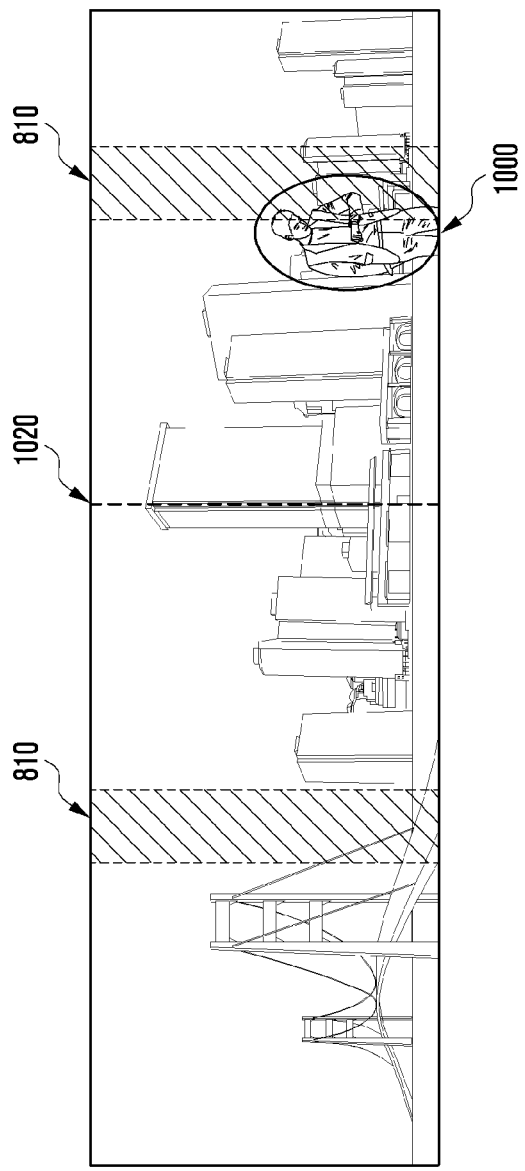
FIGS. 11A and 11B are diagrams illustrating an operation of changing a main capture view of a camera in an electronic device according to various embodiments of the present invention.
Figure 11A:
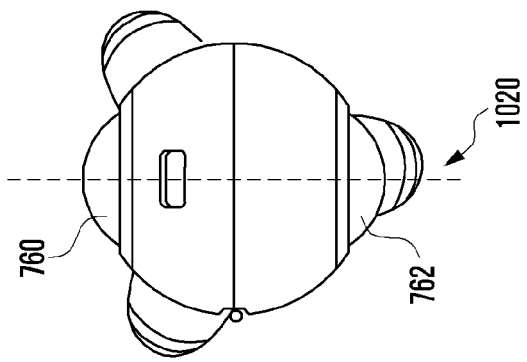
Figure 11B:
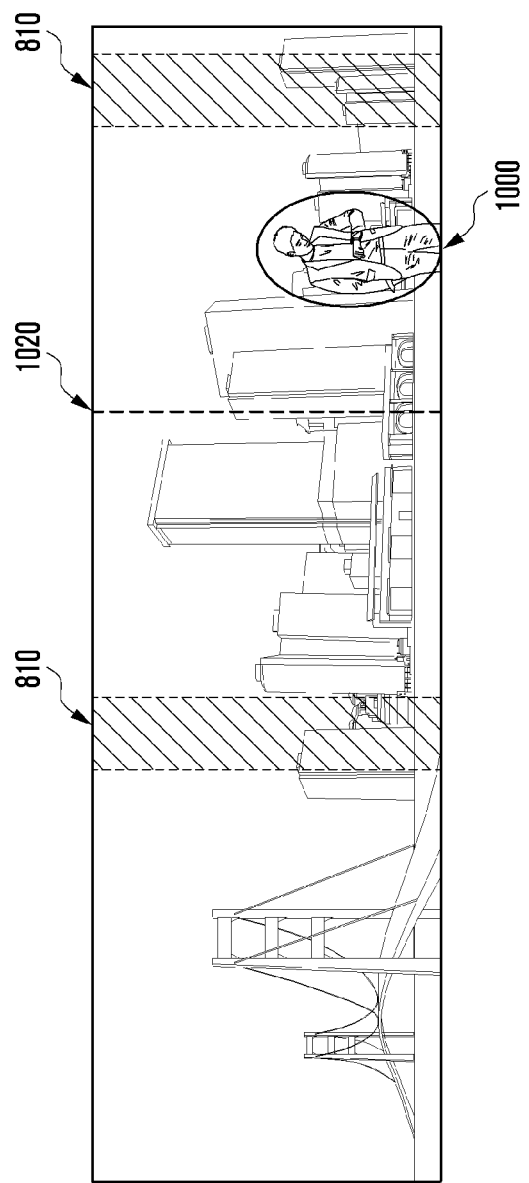
Figure 11B:
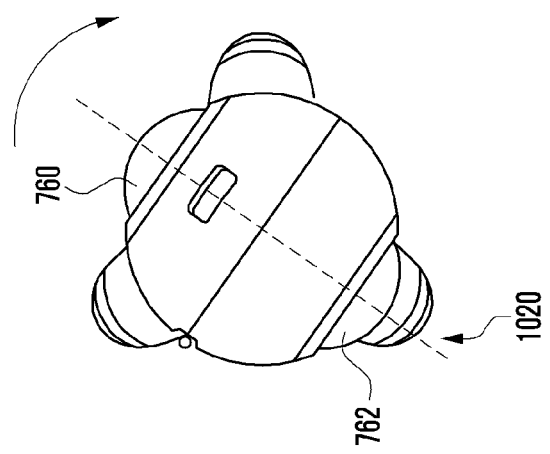

FIGS. 11A and 11B are diagrams illustrating an operation of changing a main capture view 1020 of a camera in an electronic device 700 according to various embodiments of the present invention.

The electronic device 700 according to various embodiments may acquire an omnidirectional image even with a single shot through a plurality of cameras. The omnidirectional image acquired through the electronic device 700 may contain, at least in part, the superposition area 810 which is caused by the overlap of photographable areas of the plurality of cameras.

Referring to FIG. 11A, an object 1000 contained in the omnidirectional image may be located, for example, in the superposition area 810.

As described above, when the object 1000 is located in the superposition area 810, the image distortion may occur in the omnidirectional image. For example, the object 1000 located in the superposition area 810 may be dislocated in phase or partially deleted.

According to various embodiments, the user may see an object on the image of the omnidirectional image received from the electronic device 700 via an external electronic device (e.g., the HMD 400). In this case, if the object 1000 considered as a main target (e.g., a family) is expressed in a distorted image in the omnidirectional image, this may disappoint the user.

When the object 1000 is located in the superposition area 810, the electronic device 700 according to various embodiments may change the main capture view 1020 of the camera through the rotation part 740 as shown in FIG. 11B.

When the main capture view 1020 of the camera is changed, the object 1000 located in the superposition area 810 as shown in FIG. 11A may be moved out of the superposition area 810. Accordingly, the user can view the image of the omnidirectional image in which the object 1000 is not distorted on the image.

Figure 12:
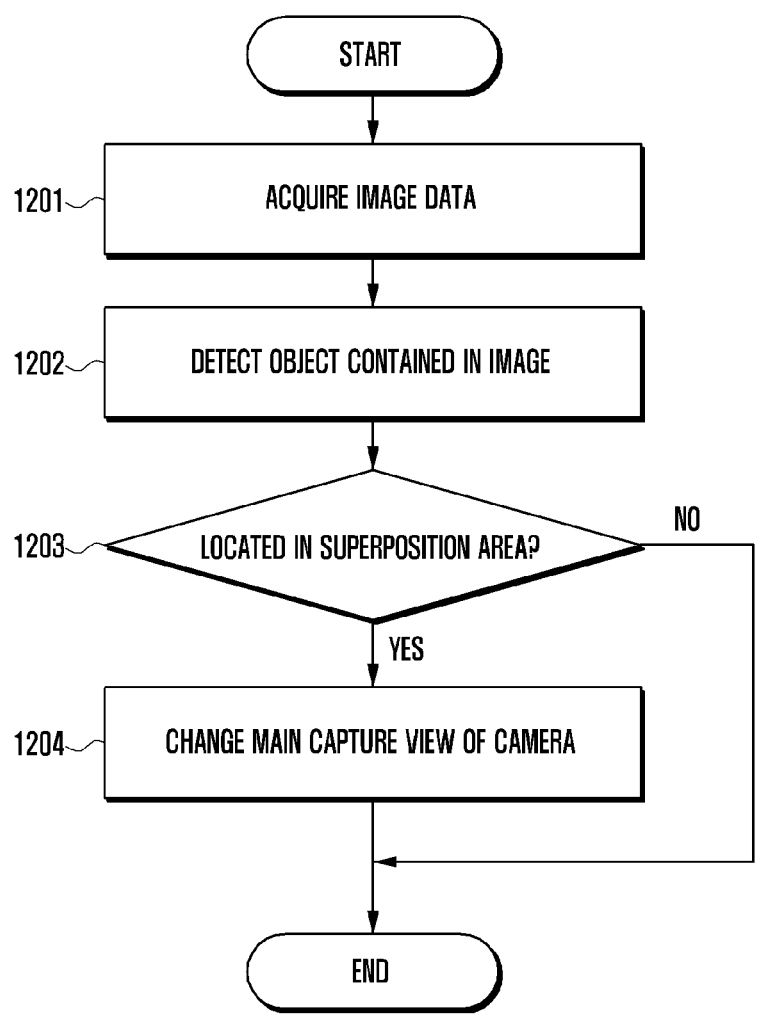
FIGS. 12 and 13 are flow diagrams illustrating a method for preventing image distortion of an electronic device according to various embodiments of the present invention.
Figure 13:
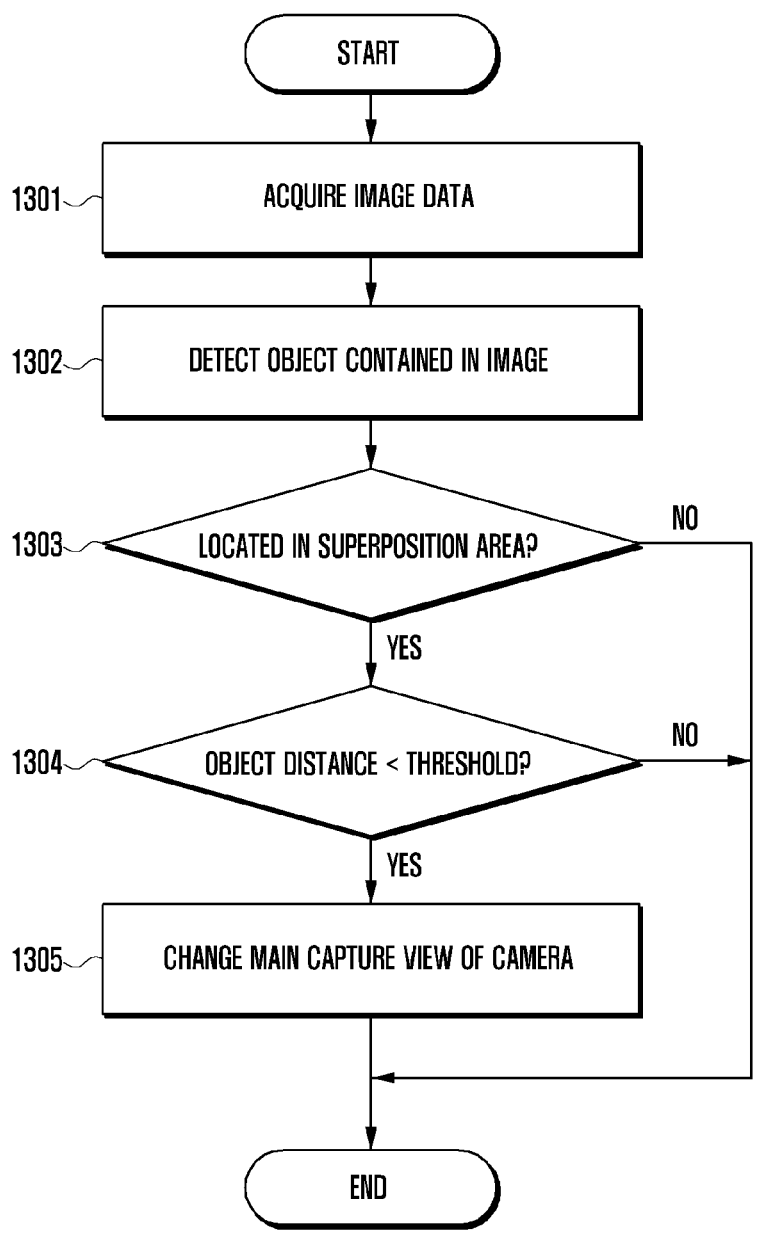

FIGS. 12 and 13 are flow diagrams illustrating a method for preventing image distortion of an electronic device 700 according to various embodiments of the present invention.

Referring to FIG. 12, at operation 1201, the electronic device 700 according to various embodiments may acquire image data by using a plurality of cameras.

Although not shown, the electronic device 700 according to various embodiments may acquire sensor data by using the sensor module 730 equipped therein. For example, such data acquired using the sensor module 730 may include location information of the object 1000, distance information 1010 between the electronic device 700 and the object 1000, or horizontal/vertical information of the cameras 760 and 762.

According to various embodiments, at operation 1202, the electronic device 700 may detect the object 1000 contained in the image by using the acquired image data or sensor data. For example, the electronic device 700 may detect the location information of the object 1000 and the distance information 1010 between the electronic device 700 and the object 1000.

According to various embodiments, at operation 1203, the electronic device 700 may determine, based on the detected information, whether the object 1000 is located in the superposition area 810.

According to various embodiments, at operation 1204, the electronic device 700 may change the main capture view 1020 of the camera when it is determined at operation 1203 that the object 1000 is located in the superposition area 810.

Operations 1301 to 1303 in FIG. 13 are the same as operations 1201 to 1203, and a description thereof will be omitted.

Referring to FIG. 13, when it is determined at operation 1303 that the object 1000 is located in the superposition area 810, the electronic device 700 according to various embodiments may identify, at operation 1304, information about the distance 1010 between the electronic device 700 and the object 1000.

When the distance 1010 between the electronic device 700 and the object 1000 is within a predetermined threshold which is set in advance in the electronic device 700, the electronic device 700 may change, at operation 1305, the main capture view 1020 of the camera to move the object 1000 out of the superposition area 810.

When it is determined at operation 1303 that the object 1000 is not located in the superposition area 810, or when it is identified at operation 1304 that the distance 1010 between the electronic device 700 and the object 1000 is greater than the predetermined threshold, the electronic device 700 may perform capturing without controlling the camera direction.

Figure 14A:
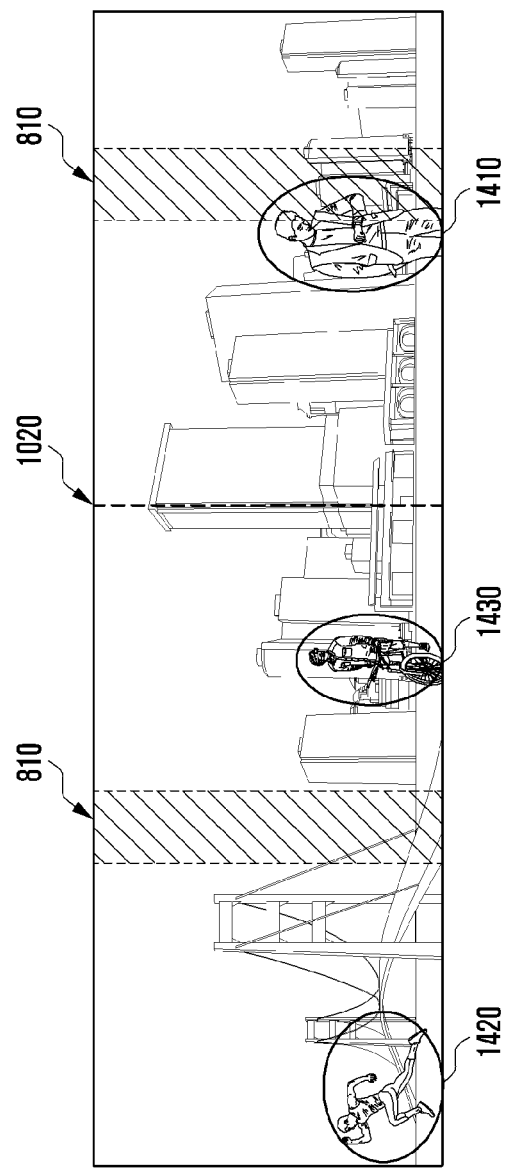
FIGS. 14A and 14B are diagrams illustrating operations for preventing image distortion of a main object in an electronic device according to various embodiments of the present invention.
Figure 14B:
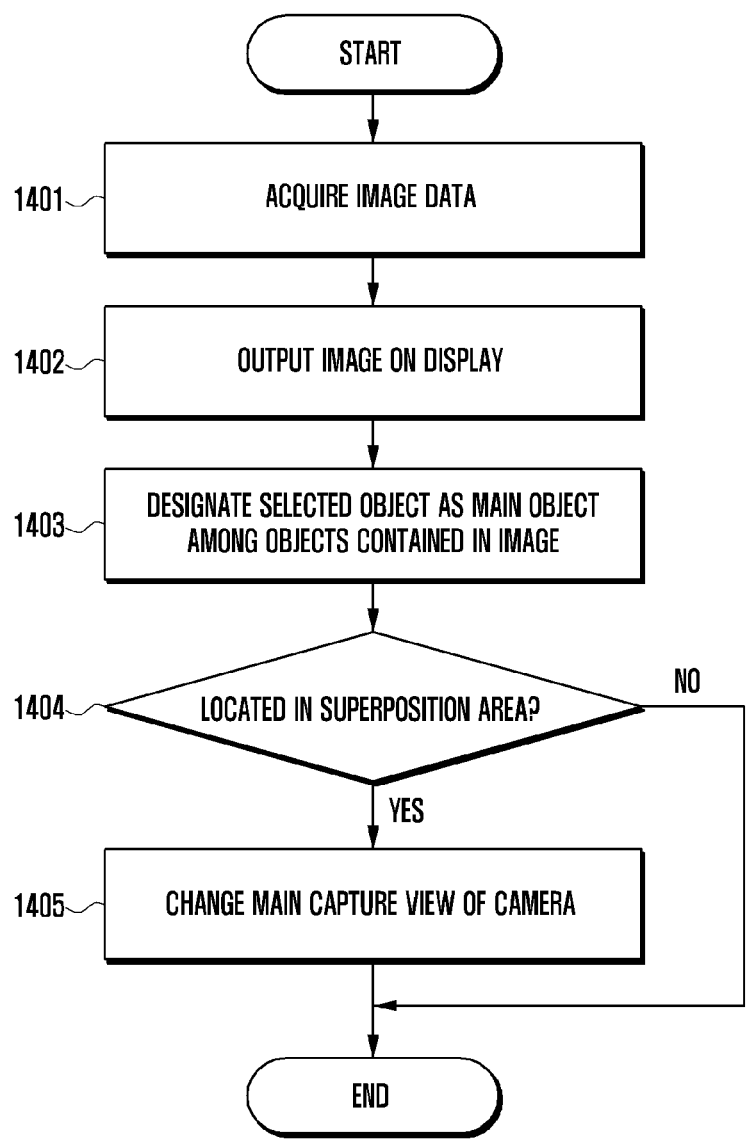

FIGS. 14A and 14B are diagrams illustrating operations for preventing image distortion of a main object in an electronic device 700 according to various embodiments of the present invention.

According to various embodiments, at operation 1401, the electronic device 700 may acquire image data through a plurality of cameras.

According to various embodiments, at operation 1402, the image acquired by the electronic device 700 may be provided to the user via an output device, e.g., a display of an external electronic device.

According to various embodiments, at operation 1403, the user may identify a plurality of objects 1410, 1420, and 1430 contained in the outputted image. For example, the user may select, as a main object, at least one of the identified objects 1410, 1420, and 1430.

For example, the electronic device 700 or the external electronic device (e.g., the HMD) may receive input information about the object selected by the user through an input device.

For example, the electronic device 700 may designate the object selected by the user as the main object, based on the input information received from the sensor module 760 of the electronic device 700 or the external electronic device.

According to various embodiments, at operation 1404, the electronic device 700 may determine whether the main object is located in the superposition area 810.

For example, when the main object is located in the superposition area 810, the electronic device 700 may change the main capture view 1020 of the camera at operation 1405. When the main object is located outside the superposition area 810, the electronic device 700 may perform capturing without additional operation of controlling the camera direction.

Although not shown, when the main object is located in the superposition area 810, the electronic device 700 may calculate the distance between the electronic device 700 and the main object and then, if the calculated distance is within a predetermined threshold, may perform an operation of changing the main capture view 1020 of the camera.

According to another embodiment, even if there is no user's selection of the main object, the electronic device 700 may change the main capture view of the camera, based on a predetermined condition, to minimize the image distortion caused by objects located in the superposition area.

The electronic device 700 may recognize a plurality of objects located in the capture area. For example, the electronic device 700 may recognize such objects through facial recognition or object motion tracking.

When the plurality of objects are recognized, the electronic device 700 may change the main capture view of the camera so as to minimize the number or size of objects located in the superposition area.

For example, the electronic device 700 may calculate the distance between each recognized object and the electronic device 700, determine whether each object is located in the superposition area, and also determine whether the distance between each object and the electronic device 700 is within a threshold. Then, the electronic device 700 may change the main capture view 1020 of the camera in a direction for minimizing the number (or size) of objects corresponding to a predetermined condition.

Figure 15A:
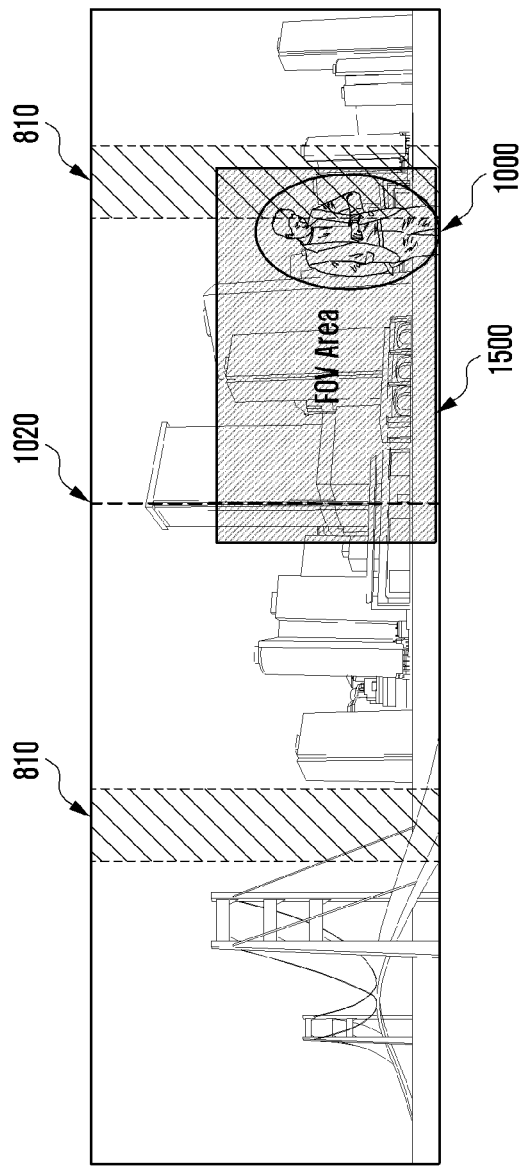
FIGS. 15A and 15B are diagrams illustrating an FOV area in an image of an electronic device according to various embodiments of the present invention.
Figure 15B:
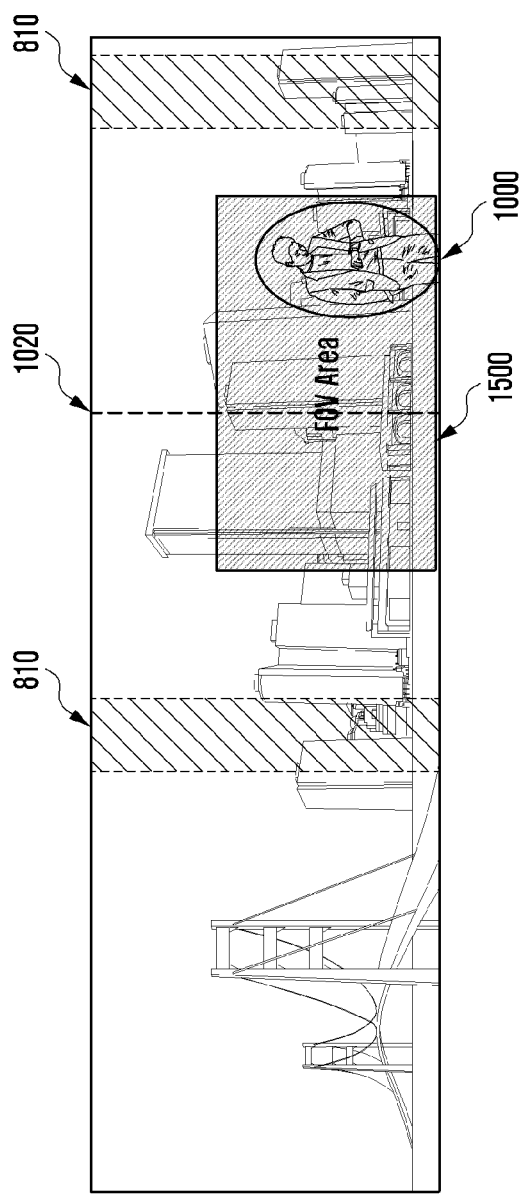

In another example, the electronic device 700 may calculate distance information between objects, based on the location of each of the recognized objects. Then, based on the calculated distance between objects, the electronic device 700 may change the main capture view 1020 of the camera to minimize the image distortion. FIGS. 15A and 15B are diagrams illustrating an image rotation correction operation in an electronic device 700 according to various embodiments of the present invention.

FIG. 15A is a diagram illustrating an example of an image when an object (or a main object) 1000 is located in a superposition area 810 in an image acquired from the electronic device 700 according to various embodiments, and FIG. 15B is a diagram illustrating an example of an image acquired after changing a main capture view 1020 of a camera so that the object 1000 on the image is located outside the superposition area.

According to various embodiments, the user may see a portion of the image acquired from the electronic device 700 via a display of an external electronic device (e.g., the HMD).

For example, the user may see a portion of the image contained in the omnidirectional image through a field of view (FOV) area 1500 displayed through the display of the HMD.

As shown in FIGS. 15A and 15B, the FOV area may be maintained regardless of the main capture view 1020 of the camera, unless a user's input for changing the FOV area is received. For example, the user may see only the image area of a specific orientation in the omnidirectional image regardless of the change of the main capture view 1020 of the camera, unless the FOV area 1500 is changed through input information such as a head motion.

According to various embodiments, the electronic device 700 may control the main capture view 1020 of the camera in consideration of only an object located in the FOV area 1500. For example, the electronic device 700 may control the main capture view 1020 of the camera only when the object located in the FOV area 1500 is within the superposition area 810.

Figure 16:
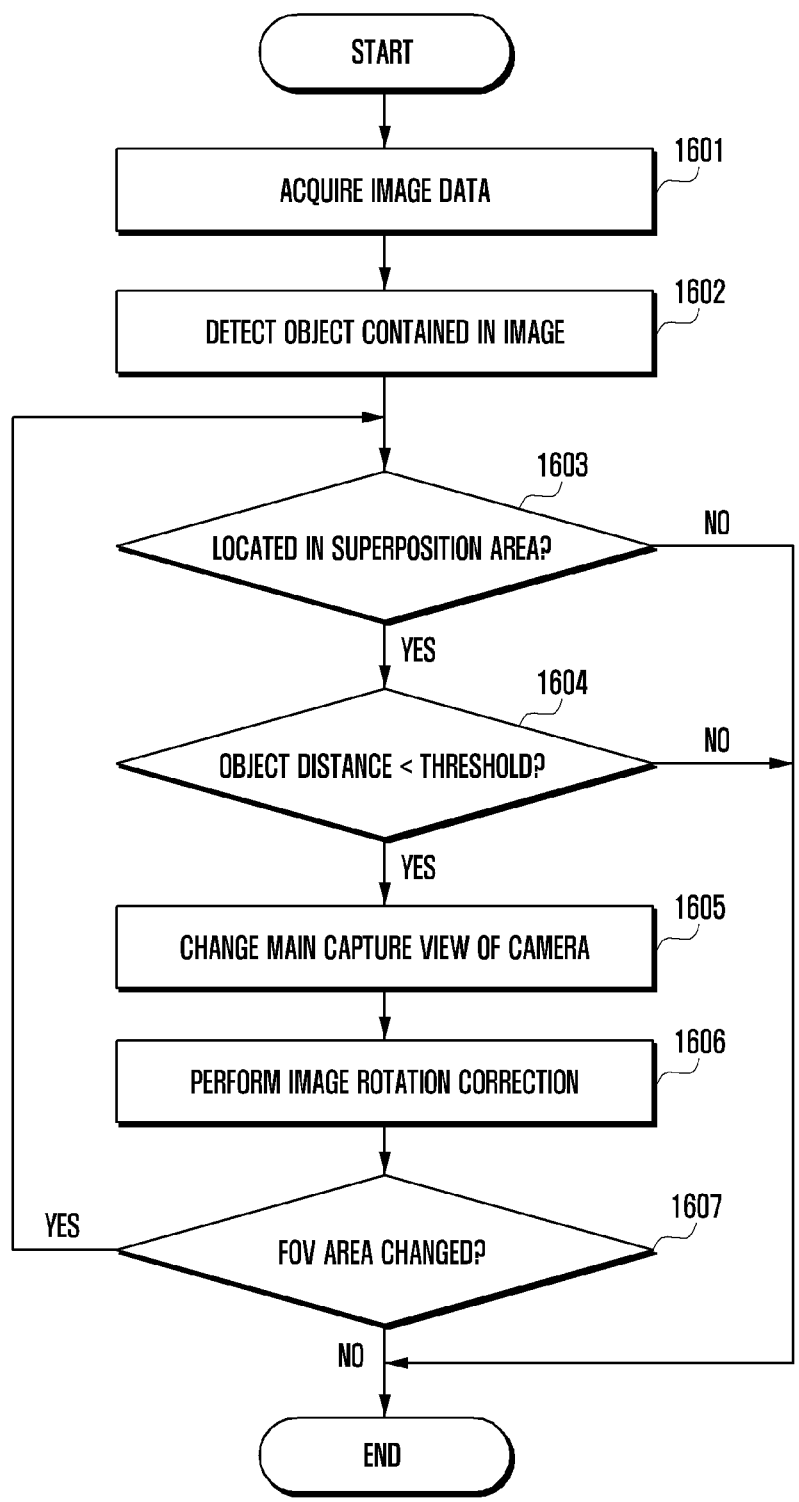
FIG. 16 is a flow diagram illustrating an image distortion prevention method including an operation of correcting an image rotation by an electronic device according to various embodiments of the present invention.

FIG. 16 is a flow diagram illustrating an image distortion prevention method including an operation of correcting an image rotation by an electronic device 700 according to various embodiments of the present invention.

Operations 1601 to 1604 in FIG. 16 are the same as operations 1301 to 1304 shown in FIG. 13, and therefore the description thereof will be omitted.

According to various embodiments, when an objection location satisfies a condition of operation 1603 (and operation 1604), the electronic device 700 may change the main capture view 1020 of the camera at operation 1605.

When the main capture view 1020 of the camera is changed in accordance with the rotation of the camera, the image area seen by the user through the image output device (e.g., the display) may move together in correspondence with the rotation orientation of the camera even if an input for changing the FOV area 1500 is not received.

When the main capture view 1020 of the camera is changed, the absolute position captured by the camera may be changed corresponding to the rotation orientation of the camera. However, the image area seen by the user through the image output device needs not be changed.

For example, at operation 1606, the electronic device 700 according to various embodiments may perform an image rotation correction for the omnidirectional image so that the user cannot feel the change of the main capture view 1020 of the camera. For example, the electronic device 700 may perform the image rotation correction for the omnidirectional image along the geomagnetic direction of the camera or object.

According to another embodiment, the object considered at operation 1603 (and operation 1604) may be set to be limited to an object located in the FOV area 1500.

For example, when the main object to be checked by the user is located in the FOV area 1500 and also located within the superposition area 810 in the FOV area 1500, and when the distance between the electronic device 700 and the main object is within a threshold, the main capture view 1020 of the camera may be changed. For example, when the main capture view 1020 of the camera is changed, the main object may move out of the FOV area 1500.

According to various embodiments, at operation 1607, the external device (e.g., the HMD) may change the FOV area by tracking a head motion of the user. At this time, the electronic device 700 may consider the change of the FOV area due to the user's head motion, and the change of the main capture view 1020 of the camera may not affect any change of the FOV area.

According to various embodiments, only based on the camera motion, the electronic device 700 may determine whether to perform 360-degree image rotation correction.

According to an embodiment, when the change of the FOV area is received, the electronic device 700 may identify whether the main object is located in the FOV area, and perform again operations 1603 to 1606.

According to another embodiment, regardless of whether the object is located in the FOV area, the electronic device 700 may detect only the change in the main capture view 1020 of the camera and perform the image rotation correction based on the detected change.

Figure 17:
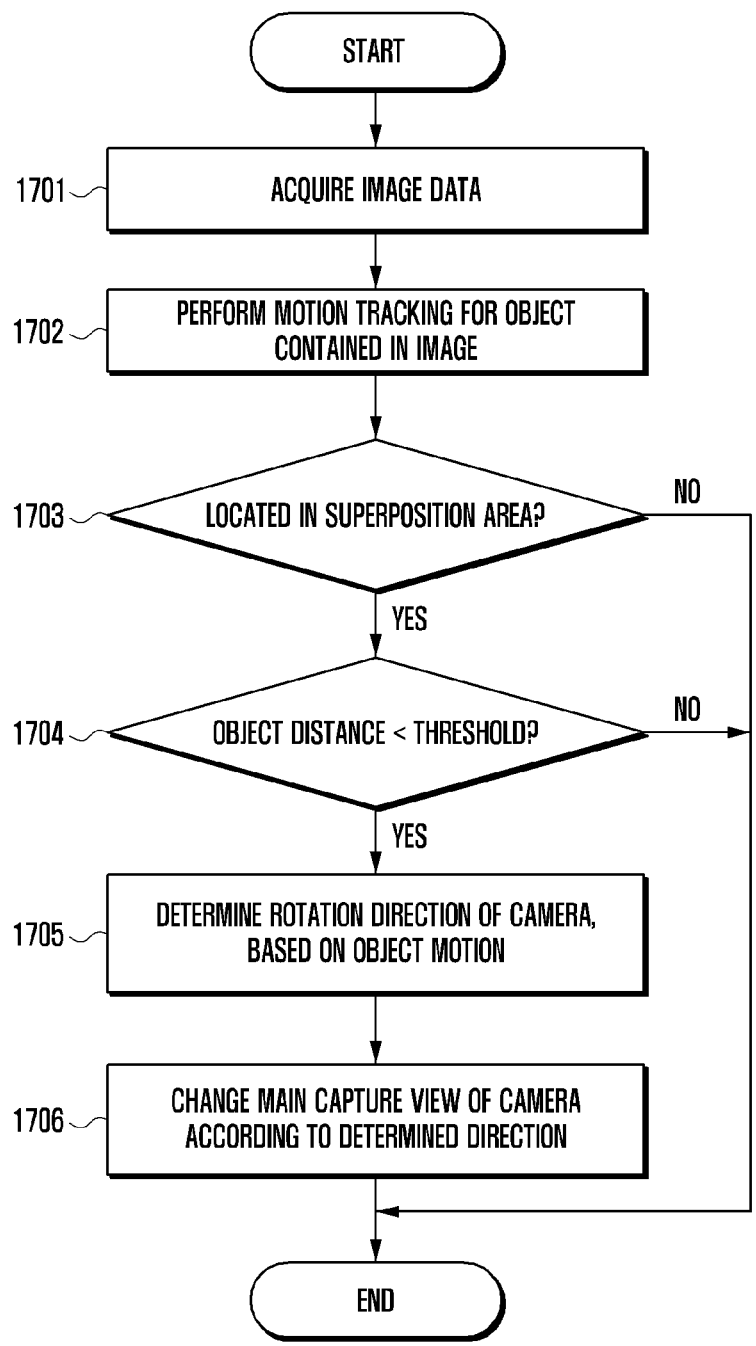
FIG. 17 is a flow diagram illustrating an image distortion prevention method including an operation of determining a main capture view of a camera in an electronic device according to various embodiments of the present invention.

FIG. 17 is a flow diagram illustrating an image distortion prevention method including an operation of determining a main capture view 1020 of a camera in an electronic device 700 according to various embodiments of the present invention.

According to various embodiments, at operations 1701 and 1702, the electronic device 700 may acquire image data from a plurality of cameras and track the motion of an object from the acquired image data. For example, the electronic device 700 may determine whether the object is located in the superposition area 810 and whether the object is moving away or near the left or right direction with respect to the main capture view of a specific camera.

According to various embodiments, at operation 1703, the electronic device 700 may determine whether the object is located in the superposition area 810. For example, when the object is located outside the superposition area 810 and then enters the superposition area 810 according to the movement of the object, the electronic device 700 may recognize the object located in the superposition area 810 and then perform operation 1704.

According to various embodiments, at the operation 1704, the electronic device 700 may calculate the distance between the electronic device 700 and the object and then determine whether the distance is within a predetermined threshold. If so, operation 1705 may be performed.

Although FIG. 17 illustrates the operation 1704, the electronic device 700 according to various embodiments may selectively omit the operation 1704. For example, when it is determined at operation 1703 that the object is located in the superposition area 810, the electronic device 700 may skip the operations 1704 and perform the operation 1705 immediately.

According to various embodiments, at the operation 1705, the electronic device 700 may determine the rotation direction of the camera, based on the movement direction of the object identified at the operation 1702.

For example, when the object continuously moves in one direction and then reaches the superposition area 810, the electronic device 700 may move the main capture view of the first camera 760 to left or right so that the object is located outside the superposition area 810.

Here, based on the movement direction of the object, the electronic device 700 may determine the rotation direction of the camera as a direction in which the object may not enter the superposition area 810 again.

For example, when the object continuously moves from left to right with respect to the main capture view of the first camera 760 and then reaches the superposition area 810, the electronic device 700 may determine the rotation direction of the camera as a direction from light to left with respect to the main capture view of the first camera 760.

At operation 1706, according to various embodiments, the electronic device 700 may change the main capture view of the camera in accordance with the determined camera rotation direction.

The electronic device 700 according to various embodiments may determine the rotation direction of the camera, based on the movement direction of the object, thereby minimizing camera motion control to prevent the image distortion.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions.

According to various embodiments, at least a part of the device (e.g., modules or functions thereof) or the method (e.g., operations) may be implemented as instructions stored in a non-transitory computer-readable storage medium (e.g., the memory 130) in a programming module form. When the instructions are executed by a processor (e.g., 120), the processor may perform a function corresponding to the instructions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler.

A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added.

While this disclosure contains many specific implementation details, these should not be construed as limitations on the scope of the invention or of what may be claimed, but rather as descriptions of features that may be specific to particular embodiments of particular invention.

The invention claimed is:

1. An electronic device comprising:
a plurality of cameras;
a rotation part configured to rotate the plurality of cameras;
a memory; and
a processor electrically connected to the rotation part and the memory,
wherein the memory stores instructions causing, upon execution, the processor to:
acquire at least one image data by using the cameras,
determine, from the image data, whether an object is located at least in part in a superposition area,
change a capture view of the cameras by using the rotation part when the object is located at least in part in the superposition area, so that the object is located outside the superposition area,
track a movement direction of the object from the image data,
determine a rotation direction of the cameras, based on the movement direction of the object, when the object is located at least in part in the superposition area,
change the capture view of the cameras by using the rotation part in accordance with the determined rotation direction, and
determine the rotation direction of the cameras in a direction opposite to the movement direction of the object when the object is located at least in part in the superposition area.

2. The electronic device of claim 1, wherein the memory stores instructions causing, upon execution, the processor to:
calculate a distance between the electronic device and the object from the image data, and
change the capture view of the cameras by using the rotation part when the object is located at least in part in the superposition area and when the calculated distance is within a predetermined threshold.

3. The electronic device of claim 2, further comprising:
a sensor module,
wherein the memory stores instructions causing, upon execution, the processor to:
acquire sensor data on the object by using the sensor module,
determine, from the image data or the sensor data, whether the object is located at least in part in the superposition area, and
calculate the distance between the electronic device and the object from the image data or the sensor data.

4. The electronic device of claim 2, wherein the memory stores instructions causing, upon execution, the processor to:
generate an omnidirectional image, based on the image data, and
perform a rotation correction for the omnidirectional image, based on a changing degree of the capture view when the capture view of the cameras is changed.

5. The electronic device of claim 1, further comprising:
a communication module,
wherein the memory stores instructions causing, upon execution, the processor to:
receive an instruction for a main object designation from an external device via the communication module,
designate a main object based on the instruction for the main object designation, and
change the capture view of the cameras by using the rotation part when the main object is located at least in part in the superposition area.

6. The electronic device of claim 5, further comprising:
a sensor module,
wherein the memory stores instructions causing, upon execution, the processor to:
acquire sensor data on the object by using the sensor module,
calculate a distance between the electronic device and the main object by using at least one of the image data and the sensor data, and
change the capture view of the cameras by using the rotation part when the main object is located at least in part in the superposition area and when the calculated distance is within a predetermined threshold.

7. The electronic device of claim 1, further comprising:
a communication module,
wherein the memory stores instructions causing, upon execution, the processor to:
generate an omnidirectional image, based on the image data, and
transmit the omnidirectional image to an external device by using the communication module.

8. The electronic device of claim 1, wherein the superposition area is determined based on an angle of view and a capture view of the plurality of cameras, and is at least a portion of an omnidirectional image generated by the plurality of cameras.

9. The electronic device of claim 1, wherein the processor is configured to:
recognize at least one object from the image data,
determine a rotation direction of the cameras so as to minimize the objects located in the superposition area when more than two objects are recognized, and
changes the capture view of the cameras by using the rotation part according to the determined direction.

10. A method for preventing image distortion of an object contained in an omnidirectional image, the method comprising:
acquiring at least one image data from a plurality of cameras;
determining, from the image data, whether an object is located at least in part in a superposition area;
changing a capture view of the cameras when the object is located at least in part in the superposition area, so that the object is located outside the superposition area;
tracking a movement direction of the object from the image data;
determining a rotation direction of the cameras, based on the movement direction of the object, when the object is located at least in part in the superposition area;
changing the capture view of the cameras by using a rotation part in accordance with the determined rotation direction; and
determining the rotation direction of the cameras in a direction opposite to the movement direction of the object when the object is located at least in part in the superposition area.

11. The method of claim 10, further comprising:
calculating a distance between the plurality of cameras and the object, based on the image data; and
changing the capture view of the cameras when the object is located at least in part in the superposition area and when the calculated distance is within a predetermined threshold.

12. The method of claim 10, further comprising:
receiving an input for a main object designation; and
designating a main object based on the received input for the main object designation,
wherein the changing the capture view of the cameras is performed when the main object is located at least in part in the superposition area.

13. An electronic device capable of outputting an omnidirectional image, the electronic device comprising:
a display;
an input device;
a communication module configured to communicate with a plurality of cameras;
a memory; and
a processor electrically connected to the display, the input device, the communication module, and the memory,
wherein the memory stores instructions causing, upon execution, the processor to:
receive image data from the plurality of cameras through the communication module,
generate the omnidirectional image from the image data,
display the omnidirectional image through the display,
receive, through the input device, an input of selecting a main object from among objects contained in the omnidirectional image,
designate the main object, based on the received input of selecting the main object,
determine whether the main object is located in a superposition area,
transmit a control command for changing a capture view of the plurality of cameras to the plurality of cameras through the communication module when the main object is located at least in part in the superposition area, so that the object is located outside the superposition area,
track a movement direction of the object from the image data,
determine a rotation direction of the cameras, based on the movement direction of the object, when the object is located at least in part in the superposition area,
change the capture view of the cameras by using a rotation part in accordance with the determined rotation direction, and
determine the rotation direction of the cameras in a direction opposite to the movement direction of the object when the object is located at least in part in the superposition area.

* * * * *